(12) United States Patent
Shintani

(10) Patent No.: US 8,384,815 B2
(45) Date of Patent: *Feb. 26, 2013

(54) IMAGING APPARATUS

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

This patent is subject to a terminal disclaimer.

(21) Appl. No.: 12/708,132

(22) Filed: Feb. 18, 2010

(65) Prior Publication Data

US 2010/0208117 A1    Aug. 19, 2010

(30) Foreign Application Priority Data

Feb. 18, 2009    (JP) ................ 2009-034972

(51) Int. Cl.
G02B 7/28    (2006.01)
H04N 3/14    (2006.01)

(52) U.S. Cl. .................... 348/311; 396/111
(58) Field of Classification Search .......... 396/111; 348/272, 294, 311, 360
See application file for complete search history.

(56) References Cited

U.S. PATENT DOCUMENTS

| | | | |
|---|---|---|---|
| 2007/0206937 A1* | 9/2007 | Kusaka | 396/89 |
| 2007/0206939 A1* | 9/2007 | Ito et al. | 396/123 |
| 2008/0020795 A1* | 1/2008 | Kim | 455/556.1 |
| 2008/0025715 A1* | 1/2008 | Ishii | 396/105 |
| 2008/0036902 A1* | 2/2008 | Tanaka | 348/353 |
| 2008/0198257 A1 | 8/2008 | Morimoto | |
| 2010/0194931 A1 | 8/2010 | Kawaguchi et al. | |

FOREIGN PATENT DOCUMENTS

| | | |
|---|---|---|
| JP | 2007-135140 | 5/2007 |
| JP | 2007-163545 | 6/2007 |
| JP | 2007-243542 A | 9/2007 |

* cited by examiner

Primary Examiner — Clayton E LaBalle
Assistant Examiner — Dennis Hancock
(74) Attorney, Agent, or Firm — McDermott Will & Emery LLP

(57) ABSTRACT

An imaging apparatus includes: an imaging device for performing photoelectric conversion to convert light from an object into an electrical signal; a phase difference detection section for receiving the light from the object to the imaging device while the imaging device receives the light, and performing phase difference detection; a focus lens group for adjusting a focus position; a focus lens position detection section for detecting a position of a focus lens; and a control section for calculating an object distance based on an output of the focus lens position detection section and an output of the phase difference detection section and automatically selecting one of a plurality of shooting modes according to the calculated object distance.

4 Claims, 20 Drawing Sheets

IMAGING APPARATUS

CROSS-REFERENCE TO RELATED APPLICATION

This application claims priority to Japanese Patent Application. No. 2009-034972 filed on Feb. 18, 2009, the disclosure of which including the specification, the drawings, and the claims is hereby incorporated by reference in its entirety.

BACKGROUND

The present disclosure relates to an imaging apparatus including an imaging device for performing photoelectric conversion.

In recent years, digital cameras that convert an object image into an electrical signal using an imaging device such as a CCD (charge coupled device) image sensor, a CMOS (complementary metal-oxide semiconductor) image sensor or the like, digitizes the electrical signals, and records the obtained digital signals have been widely used.

Single-lens reflex digital cameras include a phase difference detection section for detecting a phase difference between object images, and have the phase difference detection AF function of performing autofocus (hereinafter merely referred to as "AF") by the phase difference detection section. Since the phase difference detection AF function allows detection of defocus direction and defocus amount, the moving time of a focus lens can be reduced, thereby achieving fast-focusing (see, for example, Japanese Patent Publication No. 2007-163545). In known single-lens reflex digital cameras, provided is a movable mirror capable of moving in or out of an optical path from a lens tube to an imaging device in order to lead light from an object to a phase difference detection section.

In so-called compact digital cameras, the autofocus function by video AF using an imaging device (see, for example, Japanese Patent Publication No. 2007-135140) is employed. Therefore, in compact digital cameras, a mirror for leading light from an object to a phase difference detection section is not provided, thus achieving reduction in the size of compact digital cameras. In such compact digital cameras, autofocus can be performed with light incident on the imaging device. That is, it is possible to perform various types of processing using the imaging device, including, for example, obtaining an image signal from an object image formed on the imaging device to display the object image on an image display section provided on a back surface of the camera or to record the object image in a recording section, while performing autoforcus. In general, this autofocus function by video AF advantageously has higher accuracy than that of phase difference detection AF.

SUMMARY

However, as in a digital camera according to Japanese Patent Publication No. 2007-135140, a defocus direction cannot be instantaneously detected by video AF. For example, when contrast detection AF is employed, a focus is detected by detecting a contrast peak, but a contrast peak direction, i.e., a defocus direction cannot be detected unless a focus lens is shifted to back and forth from its current position, or the like. Therefore, it takes a longer time to detect a focus.

In view of reducing a time required for detecting a focus, phase difference detection AF is more advantageous. However, in an imaging apparatus such as a single-lens reflex digital camera according to Japanese Patent Publication No. 2007-163545, employing phase difference detection AF, a movable mirror has to be moved to be on an optical path from a lens tube to an imaging device in order to lead light from an object to a phase difference detection section. Thus, the imaging device cannot be exposed with light while phase difference detection AF is performed.

In view of the above-described points, the present inventor has devised an imaging apparatus in which phase difference detection AF can be performed while an imaging device is exposed with light. It is a first object of the present invention to allow selection of a preferable picture shooting mode with application of the imaging apparatus. It is a second object of the present invention to smoothly perform AF using a phase difference detection method in moving picture shooting.

The first object is achieved by the following imaging apparatus.

An imaging apparatus includes: an imaging device for performing photoelectric conversion to convert light from an object into an electrical signal; a phase difference detection section for receiving the light from the object to the imaging device while the imaging device receives the light, and performing phase difference detection; a focus lens group for adjusting a focus position; a focus lens position detection section for detecting a position of a focus lens; and a control section for calculating an object distance based on an output of the focus lens position detection section and an output of the phase difference detection section and automatically selecting one of a plurality of shooting modes according to the calculated object distance.

The second object is achieved by the following imaging apparatus.

The imaging apparatus includes: an imaging device for performing photoelectric conversion to convert light from an object into an electrical signal; a phase difference detection section for receiving the light from the object to perform phase difference detection; and a control section for controlling an electrical charge storage time of the phase difference detection section, and the control section performs control so that the electrical charge storage time in still picture shooting and the electrical charge storage time in moving picture shooting and recording are different from each other.

Such an imaging apparatus allows selection of a preferable shooting mode. Moreover, such an imaging apparatus also allows smooth AF using phase difference detection in moving picture shooting.

DETAILED DESCRIPTION

Embodiments will be described hereinafter in detail with reference to the accompanying drawings.

Embodiment

A camera as an imaging apparatus according to Example Embodiment will be described.

Figure 1:
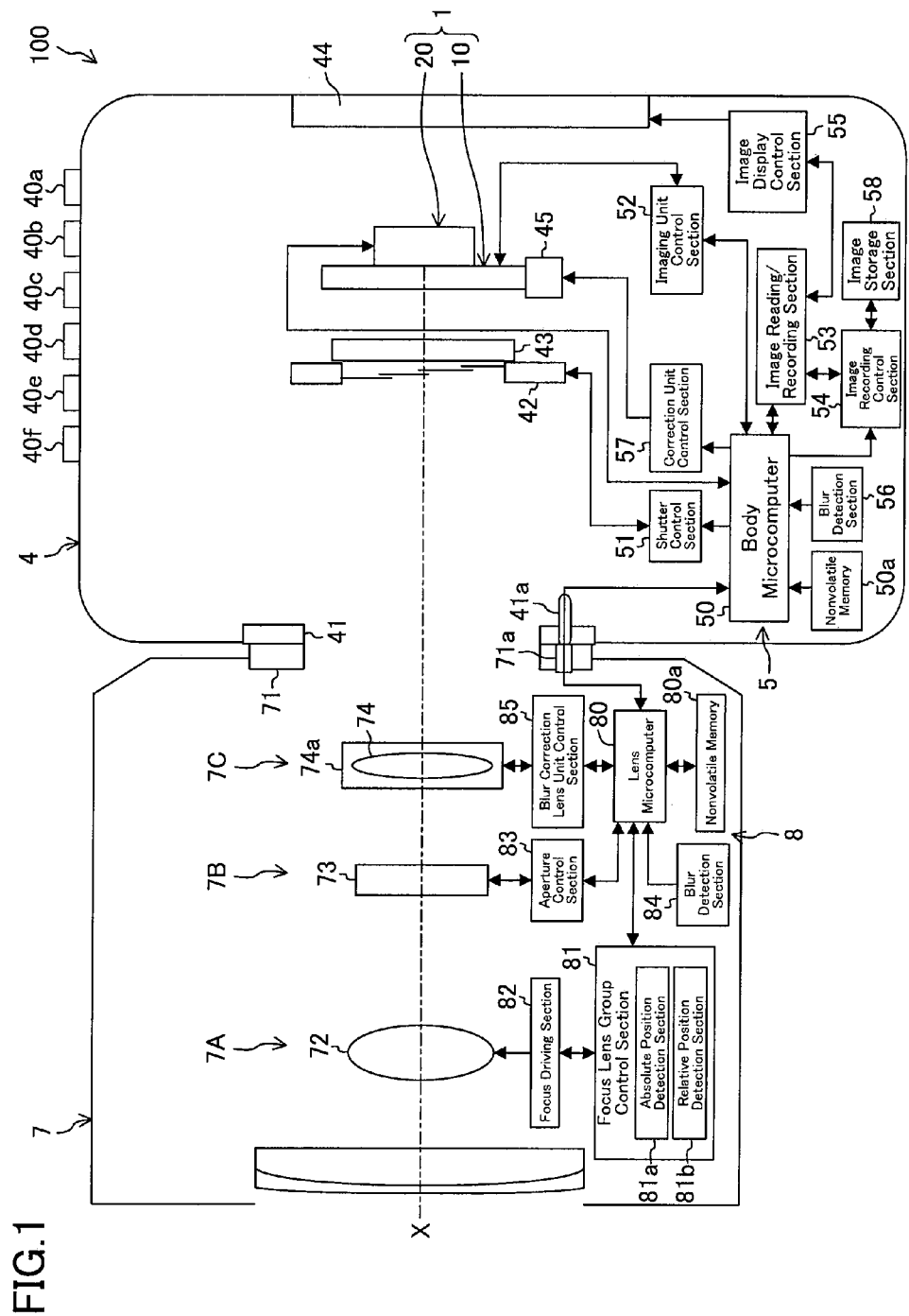
FIG. 1 is a block diagram of a camera according to Example Embodiment.

As shown in FIG. 1, a camera 100 according to Embodiment is a single-lens reflex digital camera with interchangeable lenses and includes, as major components, a camera body 4 having a major function as a camera system, and interchangeable lenses 7 removably attached to the camera body 4. The interchangeable lenses 7 are attached to a body mount 41 provided on a front face of the camera body 4. The body mount 41 is provided with an electric contact piece 41a.

—Configuration of Camera Body—

The camera body 4 includes an imaging unit 1 for capturing an object image as a shooting image, a shutter unit 42 for adjusting an exposure state of the imaging unit 1, an OLPF (optical low pass filter) 43, serving also as an IR cutter, for removing infrared light of the object image entering the imaging unit 1 and reducing the moire phenomenon, an image display section 44, formed of a liquid crystal monitor, for displaying the shooting image, a live view image and various kinds of information, and a body control section 5. The camera body 4 forms an imaging apparatus body.

In the camera body 4, a power switch 40a for turning the camera system ON/OFF, a release button 40b operated by a user when the user performs focusing and releasing operations, and setting switches 40c-40f for turning various image modes and functions ON/OFF.

When the camera system is turned ON by the power switch 40a, power is supplied to each part of the camera body 4 and the interchangeable lens 7.

The release button 40b operates as a two-stage switch. Specifically, autofocusing, AE (Automatic Exposure) or the like, which will be described later, is performed by pressing the release button 40b halfway down, and releasing is performed by pressing the release button 40b all the way down.

An AF setting switch 40c is a switch for changing an autofocus function used in still picture shooting from one to another of four autofocus functions, which will be described later. The camera body 4 is configured so that the autofocus function used in still picture shooting is set to be one of the four autofocus functions by switching the AF setting switch 40c.

A moving picture shooting mode selection switch 40d is a switch for setting/canceling a moving picture shooting mode, which will be described later. The camera body 4 is configured so that a picture shooting mode can be switched between still picture shooting mode and moving picture shooting mode by operating the moving picture shooting mode selection switch 40d.

A REC button 40e is an operating member for receiving a recording start operation and a recording stop operation for a moving picture in a moving picture shooting mode, which will be described later. When the REC button 40e is pressed, the camera 100 starts recording of a moving picture. When the REC button 40e is pressed during recording of a moving picture, the camera 100 stops recording of the moving picture.

An automatic iA setting switch 40f is a switch for performing setting/canceling an automatic iA function, which will be described later. The camera body 4 is configured so that automatic iA function can be turned ON/OFF by operating the automatic iA setting switch 40f.

The setting switches 40c-40f may be for switching other selection items in a selection menu for selecting a desired camera shooting function.

Furthermore, the macro setting switch may be provided to the interchangeable lens 7.

The imaging unit 1, which will be described in detail later, performs photoelectric conversion to convert an object image into an electrical signal. The imaging unit 1 is configured so as to be movable by a blur correction unit 45 in a plane perpendicular to an optical axis X.

The body control section 5 includes a body microcomputer 50, a nonvolatile memory 50a, a shutter control section 51 for controlling driving of the shutter unit 42, an imaging unit control section 52 for controlling of the operation of the imaging unit 1 and performing A/D conversion of an electrical signal from the imaging unit 1 to output the converted signal to the body microcomputer 50, an image reading/recording section 53 for reading image data from, for example, a card type recording medium or an image storage section 58 which is an internal memory and recording image data in the image storage section 58, an image recording control section 54 for controlling the image reading/recording section 53, an image display control section 55 for controlling display of the image display section 44, a blur detection section 56 for detecting an amount of an image blur generated due to shake of the camera body 4, and a correction unit control section 57 for controlling the blur correction unit 45. The body control section 5 forms a control section.

The body microcomputer 50 is a control device for controlling of core functions of the camera body 4, and performs control of various sequences. The body microcomputer 50 includes, for example, a CPU, a ROM and a RAM. Programs stored in the ROM are read by the CPU, and thereby, the body microcomputer 50 executes various functions.

The body microcomputer 50 is configured to receive input signals from the power switch 40a, the release button 40b and each of the setting switches 40c-40f and output control signals to the shutter control section 51, the imaging unit control section 52, the image reading/recording section 53, the image recording control section 54, the correction unit control section 57 and the like, thereby causing the shutter control section 51, the imaging unit control section 52, the image reading/recording section 53, the image recording control section 54, the correction unit control section 57 and the like to execute respective control operations. The body microcomputer 50 performs inter-microcomputer communication with a lens microcomputer 80, which will be described later.

For example, according to an instruction of the body microcomputer 50, the imaging unit control section 52 performs A/D conversion of an electrical signal from the imaging unit 1 to output the converted signal to the body microcomputer 50. The body microcomputer 50 performs predetermined image processing to the received electrical signal to generate an image signal. Then, the body microcomputer 50 transmits the image signal to the image reading/recording section 53, and also instructs the image recording control section 54 to record and display an image, and thereby, the image signal is stored in the image storage section 58 and is transmitted to the image display control section 55. The image display control section 55 controls the image display section 44, based on the transmitted image signal to display an image.

The body microcomputer 50, which will be described in detail later, is configured to detect an object point distance to the object via a lens microcomputer 80.

In the nonvolatile memory 50a, various information (unit information) for the camera body 4 is stored. The unit information includes, for example, model information (unit specific information) provided to specify the camera body 4, such as name of a manufacturer, production date and model number of the camera body 4, version information for software installed in the body microcomputer 50 and firmware update information, information regarding whether or not the camera body 4 includes sections for correcting an image blur, such as the blur correction unit 45, the blur detection section 56 and the like, information regarding detection performance of the blur detection section 56, such as a model number, detection ability and the like, error history and the like. Such information as listed above may be stored in a memory section of the body microcomputer 50, instead of the nonvolatile memory 50a.

The blur detection section 56 includes an angular velocity sensor for detecting movement of the camera body 4 due to hand shake and the like. The angular velocity sensor outputs a positive/negative angular velocity signal according to the direction in which the camera body 4 moves, using as a reference an output in a state where the camera body 4 stands still. In this embodiment, two angular velocity sensors are provided to detect two directions, i.e., a yawing direction and a pitching direction. After being subjected to filtering, amplification and the like, the output angular velocity signal is converted into a digital signal by the A/D conversion section, and then, is given to the body microcomputer 50.

—Configuration of Interchangeable Lens—

The interchangeable lens 7 forms an imaging optical system for forming an object image on the imaging unit 1 in the camera body 4, and includes, as major components, a focus adjustment section 7A for performing a focusing operation, an aperture adjustment section 7B for adjusting an aperture, a lens image blur correction section 7C for adjusting an optical path to correct an image blur, and a lens control section 8 for controlling an operation of the interchangeable lens 7.

The interchangeable lens 7 is attached to the body mount 41 of the camera body 4 via a lens mount 71. The lens mount 71 is provided with an electric contact piece 71a which is electrically connected to the electric contact piece 41a of the body mount 41 when the interchangeable lens 7 is attached to the camera body 4.

The focus adjustment section 7A includes a focus lens group 72 for adjusting a focus. The focus lens group 72 is movable in the optical axis X direction in a zone from a closest focus position predetermined as a standard for the interchangeable lens 7 to an infinite focus position. When a focus position is detected using a contrast detection method which will be described later, the focus lens group 72 has to be movable forward and backward from a focus position in the optical axis X direction. Therefore, the focus lens group 72 has a lens shift margin zone which allows the focus lens group 72 to move forward and backward in the optical axis X direction to a further distance beyond the zone ranging from the closest focus position to the infinite focus position. The focus lens group 72 does not have to be formed of a plurality of lenses, but may be formed of a signal lens.

The aperture adjustment section 7B includes an aperture section 73 for adjusting an aperture. The aperture section 73 forms an optical amount adjustment section.

The lens image blur correction section 7C includes a blur correction lens 74, and a blur correction lens driving section 74a for shifting the blur correction lens 74 in a plane perpendicular to the optical axis X.

The lens control section 8 includes a lens microcomputer 80, a nonvolatile memory 80a, a focus lens group control section 81 for controlling an operation of the focus lens group 72, a focus driving section 82 for receiving a control signal of the focus lens group control section 81 to drive the focus lens group 72, an aperture control section 83 for controlling an operation of the aperture section 73, a blur detection section 84 for detecting a blur of the interchangeable lens 7, and a blur correction lens unit control section 85 for controlling the blur correction lens driving section 74a.

The lens microcomputer 80 is a control device for controlling of core functions of the interchangeable lens 7, and is connected to each component mounted on the interchangeable lens 7. Specifically, the lens microcomputer 80 includes a CPU, a ROM, and a RAM and, when programs stored in the ROM are read by the CPU, various functions can be executed. For example, the lens microcomputer 80 has the function of setting a lens image blur correction system (the blur correction lens driving section 74a or the like) to be a correction possible state or a correction impossible state, based on a signal from the body microcomputer 50. Due to the connection of the electric contact piece 71a provided to the lens mount 71 with the electric contact piece 41a provided to the body mount 41, the body microcomputer 50 is electrically connected to the lens microcomputer 80, so that information can be transmitted/received between the body microcomputer 50 and the lens microcomputer 80.

In the nonvolatile memory 80a, various information (lens information) for the interchangeable lens 7 is stored. The lens information includes, for example, model information (lens specific information) provided to specify the interchangeable lens 7, such as name of a manufacturer, production date and model number of the interchangeable lens 7, version information for software installed in the lens microcomputer 80 and firmware update information, and information regarding whether or not the interchangeable lens 7 includes sections for correcting an image blur, such as the blur correction lens driving section 74a, the blur detection section 84, and the like. If the interchangeable lens 7 includes sections for correcting an image blur, the lens information further includes information regarding detection performance of the blur detection section 84 such as a model number, detection ability and the like, information regarding correction performance (lens side correction performance information) of the blur correction lens driving section 74a such as a model number, a maximum correctable angle and the like, version information for software for performing image blur correction, and the like. Furthermore, the lens information includes information (lens side power consumption information) regarding necessary power consumption for driving the blur correction lens driving section 74a, and information (lens side driving method information) regarding a method for driving the blur correction lens driving section 74a. The nonvolatile memory 80a can store information transmitted from the body microcomputer 50. The information listed above may be stored in a memory section of the lens microcomputer 80, instead of the nonvolatile memory 80a.

The focus lens group control section 81 includes an absolute position detection section 81a for detecting an absolute position of the focus lens group 72 in the optical axis direction, and a relative position detection section 81b for detecting a relative position of the focus lens group 72 in the optical axis direction. The absolute position detection section 81a detects an absolute position of the focus lens group 72 in a case of the interchangeable lens 7. For example, the absolute position detection section 81a includes a several-bit contact-type encoder substrate and a brush, and is capable of detecting an absolute position. The relative position detection section 81b cannot detect the absolute position of the focus lens group 72 by itself, but can detect a moving direction of the focus lens group 72, for example, using a two-phase encoder. As for the two-phase encoder, two rotary pulse encoders, two MR devices, two hole devices, or the like, for alternately outputting binary signals with an equal pitch according to the position of the focus lens group 72 in the optical axis direction are provided so that the phases of their respective pitches are different from each other. The lens microcomputer 80 calculates the relative position of the focus lens group 72 in the optical axis direction from an output of the relative position detection section 81b. The absolute position detection section 81a and the relative position detection section 81b are examples of a focus lens position detection section.

The blur detection section 84 includes an angular velocity sensor for detecting movement of the interchangeable lens 7 due to hand shake and the like. The angular velocity sensor outputs a positive/negative angular velocity signal according to the direction in which the interchangeable lens 7 moves, using, as a reference, an output in a state where the interchangeable lens 7 stands still. In this embodiment, two angular velocity sensors are provided to detect two directions, i.e., a yawing direction and a pitching direction. After being subjected to filtering, amplification and the like, the output angular velocity signal is converted into a digital signal by the A/D conversion section, and then, is given to the lens microcomputer 80.

A blur correction lens unit control section 85 includes a movement amount detection section (not shown). The movement amount detection section is a detection section for detecting an actual movement amount of the blur correction lens 74. The blur correction lens unit control section 85 performs feedback control of the blur correction lens 74 based on an output of the movement amount detection section.

An example in which the blur detection sections 56 and 84 and the blur correction units 45 and 74a are provided both to the camera body 4 and the interchangeable lens 7 has been described. However, such blur detection section and blur correction unit may be provided to either one of the camera body 4 and the interchangeable lens 7. Also, a configuration where such blur detection section and blur correction unit are not provided to either the camera body 4 or the interchangeable lens 7 is possible (in such a configuration, a sequence regarding the above-described blur correction may be eliminated).

—Configuration of Imaging Unit—

Figure 2:
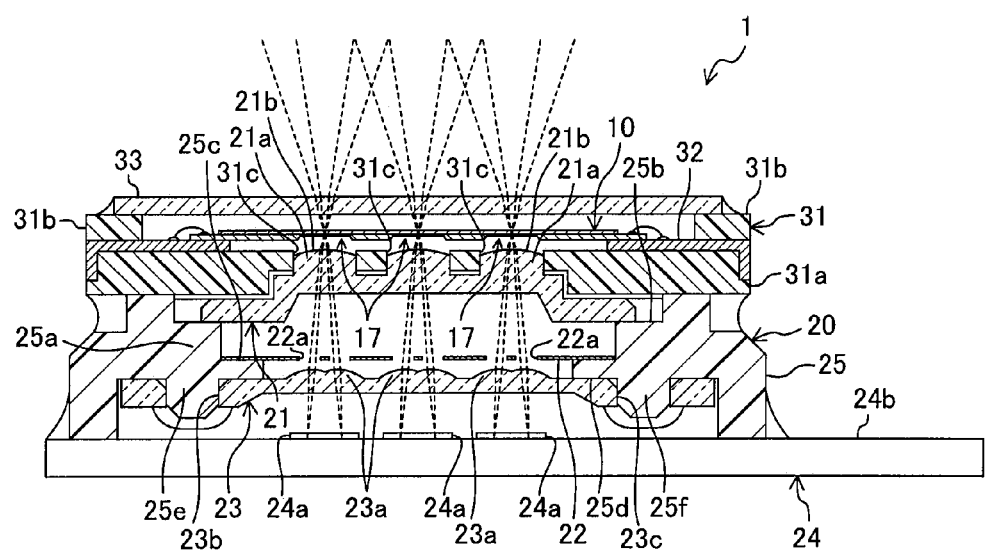
FIG. 2 is a cross-sectional view of an imaging unit.

As shown in FIG. 2, the imaging unit 1 includes an imaging device 10 for converting an object image into an electrical signal, a package 31 for holding the imaging device 10, and a phase difference detection unit 20 for performing focus detection using a phase difference detection method.

Figure 3:
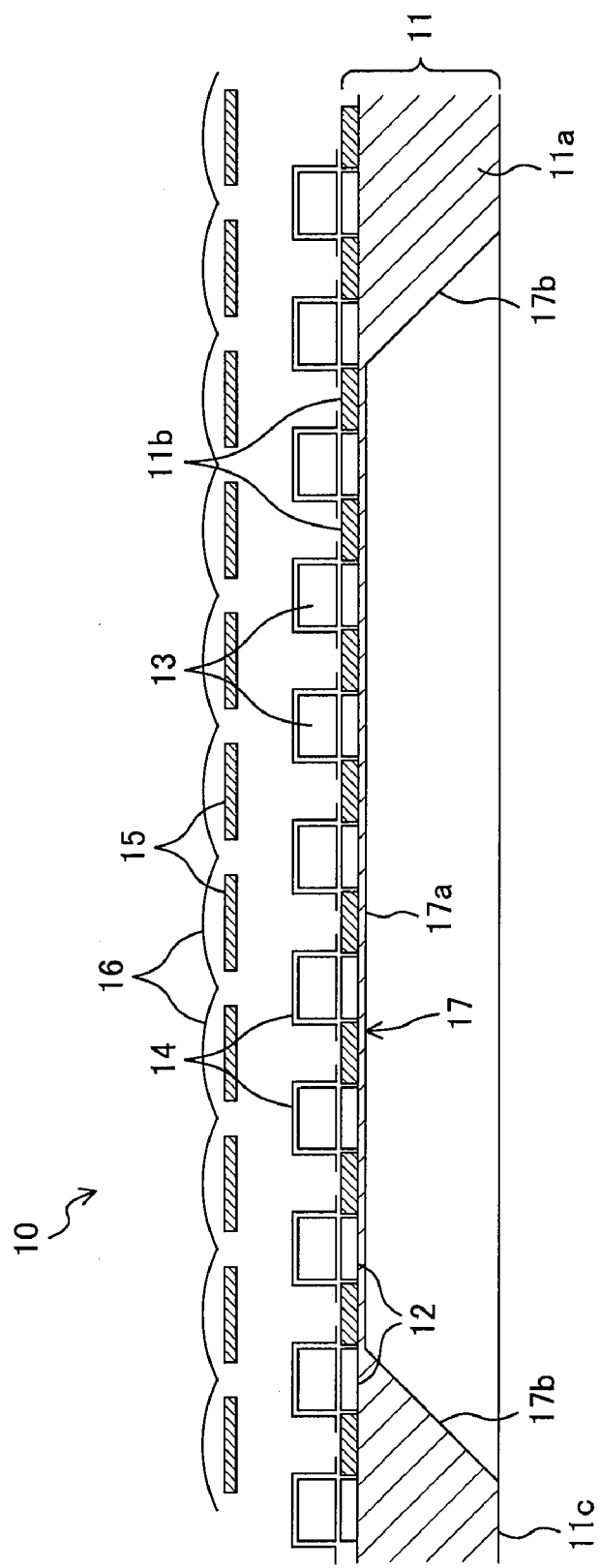
FIG. 3 is a cross-sectional view of an imaging device.

The imaging device 10 is an interline type CCD image sensor and, as shown in FIG. 3, includes a photoelectric conversion section 11 formed of a semiconductor material, vertical registers 12, transfer paths 13, masks 14, color filters 15, and microlenses 16.

The photoelectric conversion section 11 includes a substrate 11a and a plurality of light receiving sections (also referred to as "pixels") 11b arranged on the substrate 11a.

The substrate 11a is formed of a Si (silicon) based substrate. Specifically, the substrate 11a is a Si single crystal substrate or a SOI (silicon-on-insulator wafer). In particular, an SOI substrate has a sandwich structure of a $SiO_2$ thin film and Si thin films, and chemical reaction can be stopped at the $SiO_2$ film in etching or like processing. Thus, in terms of performing stable substrate processing, it is advantageous to use an SOI substrate.

Each of the light receiving sections 11b is formed of a photodiode, and absorbs light to generate electrical charges. The light receiving sections 11b are provided respectively in micro pixel regions each having a square shape, arranged in matrix on the substrate 11a (see FIG. 4).

The vertical register 12 is provided for each light receiving section 11b, and serves to temporarily store electrical charges stored in the light receiving section 11b. The electrical charges stored in the light receiving section 11b are transferred to the vertical register 12. The electrical charges transferred to the vertical register 12 are transferred to a horizontal register (not shown) via the transfer path 13, and then, to an amplifier (not shown). The electrical charges transferred to the amplifier are amplified and pulled out as an electrical signal.

The mask 14 is provided so that the light receiving sections 11b is exposed toward an object and the vertical register 12 and the transfer path 13 are covered by the mask 14 to prevent light from entering the vertical register 12 and the transfer path 13.

Figure 4:
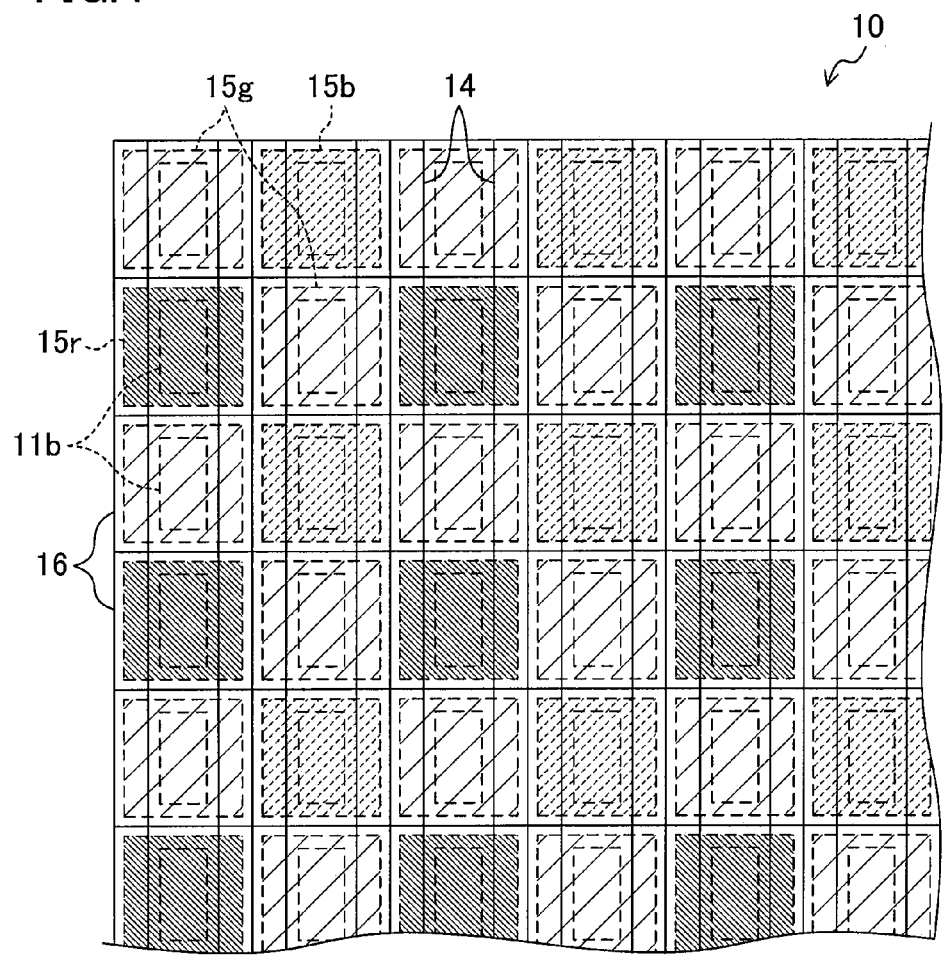
FIG. 4 is a plan view of an imaging device.

The color filter 15 and the microlens 16 are provided in each micro pixel region having a square shape so as to correspond to an associated one of the light receiving sections 11b. Each of the color filters 15 transmits only a specific color, and primary color filters or complementary color filters are used as the color filters 15. In this embodiment, as shown in FIG. 4, so-called Bayer primary color filters are used. That is, assuming that four color filters 15 arranged adjacent to one another in two rows and two columns (or in four pixel regions) are a repeat unit throughout the entire imaging device 10, two green color filters 15g (i.e., color filters having a higher transmittance in a green visible light wavelength range than in the other color visible light wavelength ranges) are arranged in a diagonal direction, and a red color filter 15r (i.e., a color filter having a higher transmittance in a red visible light wavelength range than in the other color visible light wavelength ranges) and a blue color filter 15b (i.e., a color filter having a higher transmittance in a blue visible light wavelength range than in the other color visible light wavelength ranges) are arranged in another diagonal direction. When the entire set of the color filters 15 is viewed, every second color filters in the row and column directions is the green color filter 15g.

The microlenses 16 collect light to cause the light to enter the light receiving sections 11b. The light receiving sections 11b can be efficiently irradiated with light by the microlens 16.

In the imaging device 10 configured in the above-described manner, light collected by the microlens 16 enters the color filters 15r, 15g and 15b. Then, only light having a corresponding color to each color filter transmits through the color filter, and an associated one of the light receiving sections 11b is irradiated with the light. Each of the light receiving sections 11b absorbs light to generate electrical charges. The electrical charges generated by the light receiving sections 11b are transferred to the amplifier via the vertical register 12 and the transfer path 13, and are output as an electrical signal. That is, the amount of received light having a corresponding color to each color filter is obtained from each of the light receiving sections 11b as an output.

Thus, the imaging device 10 performs photoelectric conversion at the light receiving sections 11b provided throughout the entire imaging plane, thereby converting an object image formed on an imaging plane into an electrical signal.

In this case, a plurality of light transmitting portions 17 for transmitting irradiation light are formed in the substrate 11a. The light transmitting portions 17 are formed by cutting, polishing or etching an opposite surface (hereinafter also referred to as a "back surface") 11c of the substrate 11a to a surface thereof on which the light receiving sections 11b are provided to provide concave-shaped recesses, and each of the light transmitting portions 17 has a smaller thickness than that of part of the substrate 11a around each of the light transmitting portions 17. More specifically, each of the light transmitting portions 17 includes a recess-bottom surface 17a having a smallest thickness and an inclined surfaces 17b for connecting the recess-bottom surface 17a with the back surface 11c.

Each of the light transmitting portions 17 in the substrate 11a is formed to have a thickness which allows light to transmit through the light transmitting portion 17, so that part of irradiation light onto the light transmitting portions 17 is not converted into electrical charges and transmits through the photoelectric conversion section 11. For example, with the substrate 11a formed so that each of parts thereof located in the light transmitting portions 17 has a thickness of 2-3 μm, about 50% of light having a longer wavelength than that of near infrared light to transmit through the light transmitting portions 17.

Each of the inclined surfaces 17b is set to be at an angle at which light reflected by the inclined surfaces 17b is not directed to condenser lenses 21a of the phase difference detection unit 20, which will be described later, when light transmits through the light transmitting portions 17. Thus, formation of a non-real image on a line sensor 24a, which will be described later, is prevented.

Each of the light transmitting portions 17 forms a reduced-thickness portion which transmits light entering the imaging device 10, i.e., which allows light entering the imaging device 10 to pass therethrough. The term "passing" includes the concept of "transmitting" at least in this specification.

The imaging device 10 configured in the above-described manner is held in the package 31 (see FIG. 2). The package 31 forms a holding portion.

Specifically, the package 31 includes a flat bottom plate 31a provided with a frame 32, and upright walls 31b provided in four directions. The imaging device 10 is mounted on the frame 32 so as to be surrounded by the upright walls 31b in four directions and is electrically connected to the frame 32 via bonding wires.

Moreover, a cover glass 33 is attached to respective ends of the upright walls 31b of the package 31 so as to cover the imaging plane of the imaging device 10 (on which the light receiving sections 11b are provided). The imaging plane of the imaging device 10 is protected by the cover glass 33 from dust and the like being attached thereto.

In this case, the same number of openings 31c as the number of the light transmitting portions 17 are formed in the bottom plate 31a of the package 31 so as to pass through the bottom plate 31a and to be located at corresponding positions to the respective positions of the light transmitting portions 17 of the imaging device 10, respectively. With the openings 31c provided, light which has transmitted through the imaging device 10 reaches the phase difference detection unit 20, which will be described later. The openings 31c form light passing portions.

In the bottom plate 31a of the package 31, the openings 31c do not have to be necessarily formed so as to pass through the bottom plate 31a. That is, as long as light which has transmitted through the imaging device 10 can reach the phase difference detection unit 20, a configuration in which transparent portions or semi-transparent portions are formed in the bottom plate 31a, or like configuration may be employed.

The phase difference detection unit 20 is provided in the back surface (an opposite surface to a surface facing an object) side of the imaging device 10 and receives light which has transmitted through the imaging device 10 to perform phase difference detection. Specifically, the phase difference detection unit 20 converts the received transmitted light into an electrical signal used for distance measurement. The phase difference detection unit 20 forms a phase difference detection section.

Figure 5:
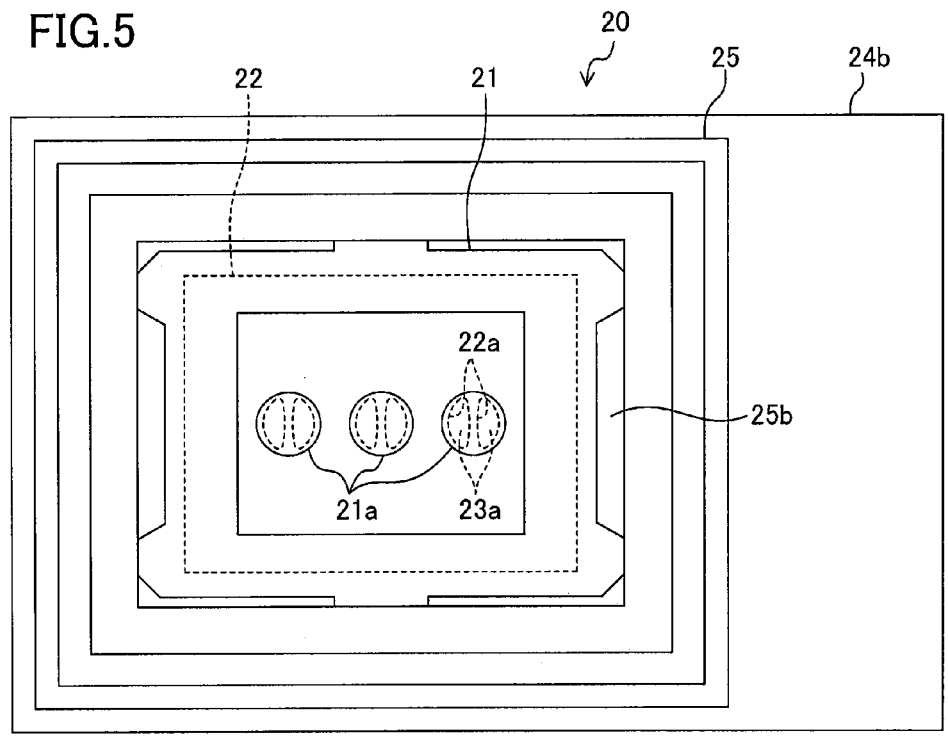
FIG. 5 is a plan view of a phase detection unit.

As shown in FIGS. 2 and 5, the phase difference detection unit 20 includes a condenser lens unit 21, a mask member 22, a separator lens unit 23, a line sensor unit 24, a module frame 25 for attaching the condenser lens unit 21, the mask member 22, the separator lens unit 23 and the line sensor unit 24. The condenser lens unit 21, the mask member 22, the separator lens unit 23 and the line sensor unit 24 are arranged in this order from the imaging device 10 side along the thickness direction of the imaging device 10.

The plurality of condenser lenses 21a integrated into a single unit form the condenser lens unit 21. The same number of the condenser lenses 21a as the number of the light transmitting portions 17 are provided. Each of the condenser lenses 21a collects incident light. The condenser lens 21a collects light which has transmitted through the imaging device 10 and spreading out therein, and leads the light to a separator lens 23a of the separator lens unit 23, which will be described later. Each of the condenser lenses 21a is formed into a circular column shape, and an incident surface 21b of the condenser lens 21a has a convex shape.

Since an incident angle of light entering each of the separator lenses 23a is reduced by providing the condenser lenses 21a, an aberration of the separator lens 23a can be reduced, and a distance between object images on a line sensor 24a which will be described later can be reduced. As a result, the size of each of the separator lenses 23a and the line sensor 24a can be reduced. Additionally, when a focus position of an object image from the imaging optical system greatly diverges from the imaging unit 1 (specifically, greatly diverges from the imaging device 10 of the imaging unit 1), the contrast of the image is remarkably reduced. According to this embodiment, however, due to the size-reduction effect of the condenser lenses 21a and the separator lenses 23a, reduction in contrast can be prevented, so that a focus detection range can be increased. If highly accurate phase difference detection around a focus position is performed, or if the separator lenses 23a, the line sensors 24a and the like are of sufficient dimensions, the condenser lens unit 21 does not have to be provided.

The mask member 22 is provided between the condenser lens unit 21 and the separator lens unit 23. In the mask member 22, two mask openings 22a are formed in a part thereof corresponding to each of the separator lenses 23a. That is, the mask member 22 divides a lens surface of each of the separator lenses 23a into two areas, so that only the two areas are exposed toward the condenser lenses 21a. More specifically, the mask member 22 performs pupil division to divide light collected by each condenser lenses 21a into two light bundles and causes the two light bundles enter the separator lens 23a. The mask member 22 can prevent harmful light from one of adjacent two of the separator lenses 23a from entering the other one of the adjacent two. Note that the mask member 22 does not have to be provided.

The separator lens unit 23 includes a plurality of separator lenses 23a. In other words, the separator lenses 23a are integrated into a single unit to form the separator lens unit 23. Like the condenser lenses 21a, the same number of the separator lens 23a as the number of light transmitting portions 17 are provided. Each of the separator lenses 23a forms two identical object images on the line sensor 24a from two light bundles which have passed through the mask member 22 and has entered the separator lens 23a.

The line sensor unit 24 includes a plurality of line sensors 24a and a mounting portion 24b on which the line sensors 24a are mounted. Like the condenser lenses 21a, the same number of the line sensors 24a as the number of the light transmitting portions 17 are provided. Each of the line sensors 24a receives a light image to be formed on an imaging plane and converts the image into an electrical signal. That is, a distance between the two object images can be detected from an output of the line sensor 24a, and a shift amount (defocus amount: Df amount) of a focus of an object image to be formed on the imaging device 10 and the direction (defocus direction) in which the focus is shifted can be obtained, based on the distance. (The Df amount, the defocus direction and the like will be hereinafter also referred to as "defocus information.")

The condenser lens unit 21, the mask member 22, the separator lens unit 23 and the line sensor unit 24, configured in the above-described manner, are provided within the module frame 25.

The module frame 25 is a member formed to have a frame shape, and an attachment portion 25a is provided along an inner circumference of the module frame 25 so as to protrude inwardly. On one side of the attachment portion 25a facing the imaging device 10, a first attachment portion 25b and a second attachment portion 25c are formed in a stepwise manner. On the other side of the attachment portion 25a, which is opposite side to the side facing the imaging device 10, a third attachment portion 25d is formed.

The mask member 22 is attached to the second attachment portion 25c of the module frame 25 from the imaging device 10 side, and the condenser lens unit 21 is attached to the first attachment portion 25b. As shown in FIGS. 2 and 5, the condenser lens unit 21 and the mask member 22 are formed so that a periphery portion of each of the condenser lens unit 21 and the mask member 22 fit in the module frame 25 when being attached to the first attachment portion 25b and the second attachment portion 25c, and thus, respective positions of the condenser lens unit 21 and the mask member 22 are determined with respect to the module frame 25.

The separator lens unit 23 is attached to the third attachment portion 25d of the module frame 25 from an opposite side to a side of the module frame 25 facing the imaging device 10. The third attachment portion 25d is provided with positioning pins 25e and direction reference pins 25f, each protruding toward an opposite side to a side facing the condenser lens unit 21. The separator lens unit 23 is provided with positioning holes 23b and direction reference holes 23c corresponding respectively to the positioning pins 25e and the direction reference pins 25f. Respective diameters of the positioning pins 25e and the positioning holes 23b are determined so that the positioning pins 25e fit in the positioning holes 23b. Respective diameters of the direction reference pins 25f and the direction reference holes 23c are determined so that the direction reference pins 25f loosely fit in the direction reference holes 23c. That is, the attitude of the separator lens unit 23 such as the direction in which the separator lens unit 23 is arranged when being attached to the third attachment portion 25d is defined by inserting the positioning pins 25e and the direction reference pins 25f of the third attachment portion 25d respectively in the positioning holes 23b and the direction reference holes 23c, and the position of the separator lens unit 23 is determined with respect to the third attachment portion 25d by providing a close fit of the positioning pins 25e with the positioning holes 23b. Thus, when the attitude and position of the separator lens unit 23 are determined and the separator lens unit 23 is attached, the lens surface of each of the separator lenses 23a is directed toward the condenser lens unit 21 and faces an associated one of the mask openings 22a.

In the above-described manner, the condenser lens unit 21, the mask member 22 and the separator lens unit 23 are attached to the module frame 25 while being held respectively at determined positions. That is, the positional relationship of the condenser lens unit 21, the mask member 22 and the separator lens unit 23 is determined by the module frame 25.

Then, the line sensor unit 24 is attached to the module frame 25 from the back side of the separator lens unit 23 (which is an opposite side to the side facing to the condenser lens unit 21). In this case, the line sensor unit 24 is attached to the module frame 25 while being held in a position which allows light which has transmitted through each of the separator lenses 23a to enter an associated one of the line sensors 24a.

Thus, the condenser lens unit 21, the mask member 22, the separator lens unit 23 and the line sensor unit 24 are attached to the module frame 25, and thus, the condenser lenses 21a, the mask member 22, the separator lenses 23a and the line sensor 24a are arranged so as to be located at respective determined positions so that incident light to the condenser lenses 21a transmits through the condenser lenses 21a to enter the separator lenses 23a via the mask member 22, and then, incident light to the separator lenses 23a forms an image on each of the line sensors 24a.

The imaging device 10 and the phase difference detection unit 20 configured in the above-described manner are joined together. Specifically, the imaging device 10 and the phase difference detection unit 20 are configured so that the openings 31c of the package 31 in the imaging device 10 closely fit the condenser lenses 21a in the phase difference detection unit 20, respectively. That is, with the condenser lenses 21a in the phase difference detection unit 20 inserted respectively in the openings 31c of the package 31 in the imaging device 10, the module frame 25 is bonded to the package 31. Thus, the respective positions of the imaging device 10 and the phase difference detection unit 20 are determined, and then the imaging device 10 and the phase difference detection unit 20 are joined together while being held in the positions. As described above, the condenser lenses 21a, the separator lenses 23a and the line sensors 24a are integrated into a single unit, and then are attached as a signal unit to the package 31.

The imaging device 10 and the phase difference detection unit 20 may be configured so that all of the openings 31c closely fit all of the condenser lenses 21a, respectively. Alternatively, the imaging device 10 and the phase difference detection unit 20 may be also configured so that only some of the openings 31c closely fit associated ones of the condenser lenses 21a, respectively, and the rest of the openings 31c loosely fit associated ones of the condenser lenses 21a, respectively. In the latter case, the imaging device 10 and the phase difference detection unit 20 are preferably configured so that one of the condenser lenses 21a and one of the openings 31c located closest to the center of the imaging plane closely fit to each other to determine positions in the imaging plane, and furthermore, one of the condenser lenses 21a and one of the openings 31c located most distant from the center of the imaging plane closely fit each other to determine circumferential positions (rotation angles) of the condenser lens 21a and the opening 31c which are located at the center of the imaging plane.

As a result of connecting the imaging device 10 and the phase difference detection unit 20, the condenser lens 21a, a pair of the mask openings 22a of the mask member 22, the separator lens 23a and the line sensor 24a are arranged in the back side of the substrate 11b to correspond to each of the light transmitting portions 17.

As described above, in relation to the imaging device 10 configured so as to transmit light therethrough, the openings 31c are formed in the bottom plate 31a of the package 31 for housing the imaging device 10, and thereby, light which has transmitted through the imaging device 10 is easily allowed to reach the back side of the package 31. Also, the phase difference detection unit 20 is arranged in the back side of the package 31, and thus, a configuration in which light which has transmitted through the imaging device 10 is received at the phase difference detection unit 20 can be easily obtained.

As long as light which has transmitted through the imaging device 10 can pass through the openings 31c formed in the bottom plate 31a of the package 31 to the back side of the package 31, any configuration can be employed. However, by forming the openings 31c as through holes, light which has transmitted through the imaging device 10 can be allowed to reach the back side of the package 31 without attenuating light which has transmitted through the imaging device 10.

With the openings 31c provided so as to closely fit the condenser lenses 21a, respectively, positioning of the phase difference detection unit 20 with respect to the imaging device 10 can be performed using the openings 31c. When the condenser lenses 21a are not provided, the separator lenses 23a may be configured so as to fit the openings 31c, respectively. Thus, positioning of the phase difference detection unit 20 with respect to the imaging device 10 can be performed in the same manner.

Besides, the condenser lenses 21a can be provided so as to pass through the bottom plate 31a of the package 31 and reach to a close point to the substrate 11a. Thus, the imaging unit 1 can be configured as a compact size imaging unit.

The operation of the imaging unit 1 configured in the above-described manner will be described hereinafter.

When light enters the imaging unit 1 from an object, the light transmits through the cover glass 33 and enters the imaging device 10. The light is collected by the microlenses 16 of the imaging device 10, and then, transmits through the color filters 15, so that only light of a specific color reaches the light receiving sections 11b. The light receiving sections 11b absorbs light to generate electrical charges. Generated electrical charges are transferred to the amplifier via the vertical register 12 and the transfer path 13, and are output as an electrical signal. Thus, each of the light receiving sections 11b converts light into an electrical signal throughout the entire imaging plane, and thereby, the imaging device 10 converts an object image formed on the imaging plane into an electrical signal for generating an image signal.

In the light transmitting portions 17, part of irradiation light to the imaging device 10 transmits through the imaging device 10. The light which has transmitted through the imaging device 10 enters the condenser lenses 21a which closely fit the openings 31c of the package 31, respectively. The light which has transmitted through each of the condenser lenses 21a and collected is divided into two light bundles when passing through each pair of mask opening 22a formed in the mask member 22, and then, enters each of the separator lenses 23a. Light subjected to pupil division transmits through the separator lens 23a and identical object images are formed on two positions on the line sensor 24a. The line sensor 24a performs photoelectric conversion to generate an electrical signal from the object images and then outputs the electrical signal.

Then, the electrical signal output from the imaging device 10 is input to the body microcomputer 50 via the imaging unit control section 52. The body microcomputer 50 obtains output data corresponding to positional information of each of the light receiving sections 11b and the light amount of light received by the light receiving section 11b from the entire imaging plane of the imaging device 10, thereby obtaining an object image formed on the image plane as an electrical signal.

In this case, in the light receiving sections 11b, even when the same light amount is received, the amount of accumulated charges are different among different lights having different wavelengths. Thus, outputs from the light receiving sections 11b of the imaging device 10 are corrected according to the types of the color filters 15r, 15g and 15b respectively provided to the light receiving sections 11b. For example, a correction amount for each pixel is determined so that respective outputs of the R pixel 11b, the G pixel 11b and the B pixel 11b become at the same level when each of a R pixel 11b to which the red color filter 15r is provided, a G pixel 11b to which the green color filter 15g is provided, and a B pixel 11b to which the blue color filter 15b is provided receives the same light amount of light corresponding to the color of each color filter.

In this embodiment, the light transmitting portions 17 are provided in the substrate 11a, and thus, the photoelectric conversion efficiency is reduced in the light transmitting portions 17, compared to the other portions. That is, even when the pixels 11b receive the same light amount, the amount of accumulated charges is smaller in ones of the pixels 11b provided in positions corresponding to the light transmitting portions 17 than in the other ones of the pixels 11b provided in positions corresponding to the other portions. Accordingly, when the same image processing as image processing for output data from the pixels 11b provided in positions corresponding to the other portions is performed to output data from the pixels 11b provided in positions corresponding to the light transmitting portions 17, parts of an image corresponding to the light transmitting portions 17 might not be able to be properly captured (for example, shooting image is dark). Therefore, an output of each of the pixels 11b in the light transmitting portions 17 is corrected to eliminate or reduce influences of the light transmitting portions 17 (for example, by amplifying an output of each of the pixels 11b in the light transmitting portions 17 or like method).

Reduction in output varies depending on the wavelength of light. That is, as the wavelength increases, the transmittance of the substrate 11a increases. Thus, depending on the types of the color filters 15r, 15g and 15b, the light amount of light which has transmitted through the substrate 11a differs. Therefore, when correction to eliminate or reduce influences of the light transmitting portions 17 on each of the pixels 11b corresponding to the light transmitting portions 17 is performed, the correction amount is changed according to the wavelength of light received by each of the pixels 11b. That is, for each of the pixels 11b corresponding to the light transmitting portions 17, the correction amount is increased as the wavelength of light received by the pixel 11b increases.

As described above, in each of the pixels 11b, the correction amount for eliminating or reducing difference of the amount of accumulated charges depending on the types of color of received light is determined. In addition to the correction to eliminate or reduce difference of the amount of accumulated charges depending on the types of color of received light, correction to eliminate or reduce influences of the light transmitting portions 17 is performed. That is, the correction amount for eliminating or reducing influences of the light transmitting portions 17 is a difference between the correction amount for each of the pixels 11b corresponding to the light transmitting portions 17 and the correction amount for the pixels 11b which correspond to the other portions than the light transmitting portions 17 and receive light having the same color. In this embodiment, different correction amounts are determined for different colors, based on the following the relationship. Thus, a stable image output can be obtained.

$$Rk > Gk > Bk \qquad \text{[Expression 1]}$$

where Rk is: a difference obtained by deducting the correction amount for R pixels in the other portions than the light transmitting portions 17 from the correction amount for R pixels in the light transmitting portions 17, Gk is: a difference obtained by deducting the correction amount for G pixels in the other portions than the light transmitting portions 17 from the correction amount for G pixels in the light transmitting portions 17, and Bk is: a difference obtained by deducting the correction amount for B pixels in the other portions than the light transmitting portions 17 from the correction amount for B pixels in the light transmitting portions 17.

Specifically, since the transmittance of red light having the largest wavelength is the highest of the transmittances of red, green and blue lights, the difference in the correction amount for red pixels is the largest. Also, since the transmittance of blue light having the smallest wavelength is the lowest of the transmittances of red, green and blue lights, the difference in the correction amount for blue pixels is the smallest.

That is, the correction amount of an output of each of the pixels 11b in the imaging device 10 is determined based on whether or not the pixel 11b is provided on a position corresponding to the light transmitting portion 17, and the type of color of the color filter 15 corresponding to the pixel 11b. For example, the correction amount of an output of each of the pixels 11b is determined so that the white balance and/or intensity is equal for each of an image displayed by an output from the light transmitting portion 17 and an image displayed by an output from some other portion than the light transmitting portion 17.

The body microcomputer 50 corrects output data from the light receiving sections 11b in the above-described manner, and then, generates, based on the output data, an image signal including positional information, color information and intensity information in each of the light receiving sections, i.e., the pixels 11b. Thus, an image signal of an object image formed on the imaging plane of the imaging device 10 is obtained.

By correcting an output from the imaging device 10, an object image can be properly captured even by the imaging device 10 provided with the light transmitting portions 17.

An electrical signal output from the line sensor unit 24 is also input to the body microcomputer 50. The body microcomputer 50 can obtain a distance between two object images formed on the line sensor 24a, based on the output from the line sensor unit 24, and then, can detect a focus state of an object image formed on the imaging device 10 from the obtained distance. For example, when the object image transmits through an imaging lens and is correctly formed on the imaging device 10 (in focus), the two object images formed on the line sensor 24a is located at predetermined reference positions with a predetermined reference distance therebetween. In contrast, when an object image is formed before the imaging device 10 in the optical axis direction (at a front pin), the distance between the two object images is smaller than the reference distance when the object image is in focus. When an object image is formed behind the imaging device 10 in the optical axis direction (at a rear pin), the distance between the two object images is larger than the reference distance when the object image is in focus. That is, an output from the line sensor 24a is amplified, and then, an arithmetic circuit performs an operation, so that whether an object image is in focus or not, at which the front pin or the rear pin an object image is formed, and the Df amount can be known.

In this embodiment, each of the light transmitting portions 17 formed in the substrate 11a so as to have a smaller thickness than parts of the substrate 11a located around the light transmitting portion 17. However, the configuration of a light transmitting portion is not limited thereto. For example, the thickness of the entire substrate 11a may be determined so that part of irradiation light onto the substrate 11a transmits, in a sufficient amount through the substrate 11a, to reach the phase difference detection unit 20 provided in the back side of the substrate 11a. In such a case, the entire substrate 11a serves as a light transmitting portion.

Figure 6:
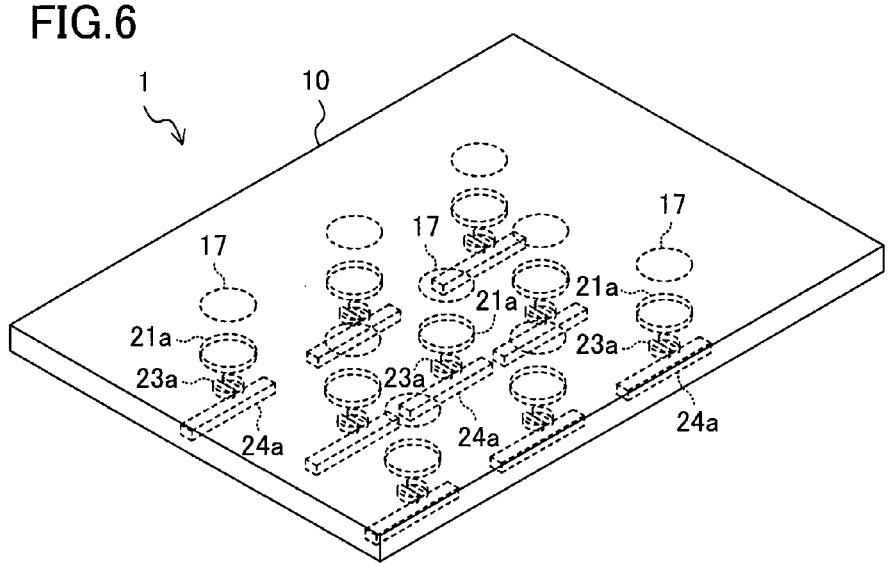
FIG. 6 is a perspective view of an imaging unit according to a modified example.

According to this embodiment, three light transmitting portions 17 are formed in the substrate 11a, and three sets of the condenser lens 21a, the separator lens 23a and line sensor 24a are provided so as to correspond the three light transmitting portions 17. However, the configuration including those components is not limited thereto. The number of sets of those components is not limited to tree, but may be any number. For example, as shown in FIG. 6, nine light transmitting portions 17 may be formed in the substrate 11a, and accordingly, nine sets of the condenser lens 21a, the separator lens 23a and line sensor 24a may be provided.

Figure 7:
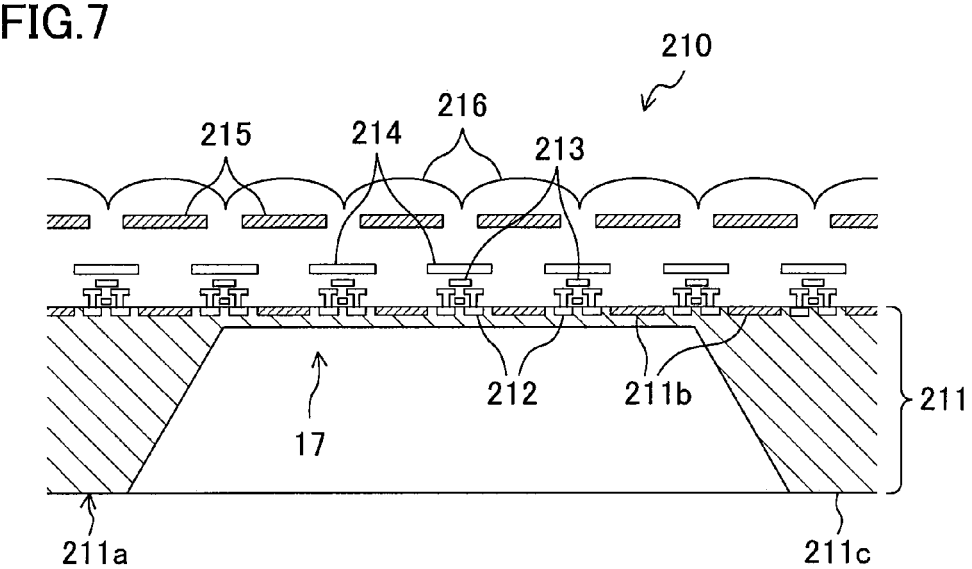
FIG. 7 is a cross-sectional view of an imaging device according to a modified example.

Furthermore, the imaging device 10 is not limited to a CCD image sensor, but may be, as shown in FIG. 7, a CMOS image sensor.

An imaging device 210 is a CMOS image sensor, and includes a photoelectric conversion section 211 formed of a semiconductor material, transistors 212, signal lines 213, masks 214, color filters 215, and microlenses 216.

The photoelectric conversion section 211 includes a substrate 211a, and light receiving sections 211b each being formed of a photodiode. The transistor 212 is provided for each of the light receiving sections 211b. Electrical charges accumulated in the light receiving sections 211b are amplified by the transistors 212 and are output to the outside via the signal lines 213. Respective configurations of the masks 214, the color filters 215 and the microlenses 216 are the same as those of the mask 14, the color filter 15 and the microlens 16, respectively.

As in the CCD image sensor, the light transmitting portions 17 for transmitting irradiation light are formed in the substrate 211a. The light transmitting portions 17 are formed by cutting, polishing or etching an opposite surface (hereinafter also referred to as a "back surface") 211c of the substrate 211a to a surface thereof on which the light receiving sections 211b are provided to provide concave-shaped recesses, and each of the light transmitting portions 17 is formed to have a smaller thickness than that of a part of the substrate 11a around each of the light transmitting portions 17.

In the CMOS image sensor, an amplifier factor of the transistor 212 can be determined for each light receiving section 211b. Therefore, by determining the amplifier factor of each transistor 212, based on whether or not each light receiving section 211b is located at a position corresponding to the light transmitting portion 17 and the type of color of the color filter 15 corresponding to the light receiving section 211b, a case where parts of an image corresponding to the light transmitting portions 17 are not properly captured can be avoided.

Figure 8:
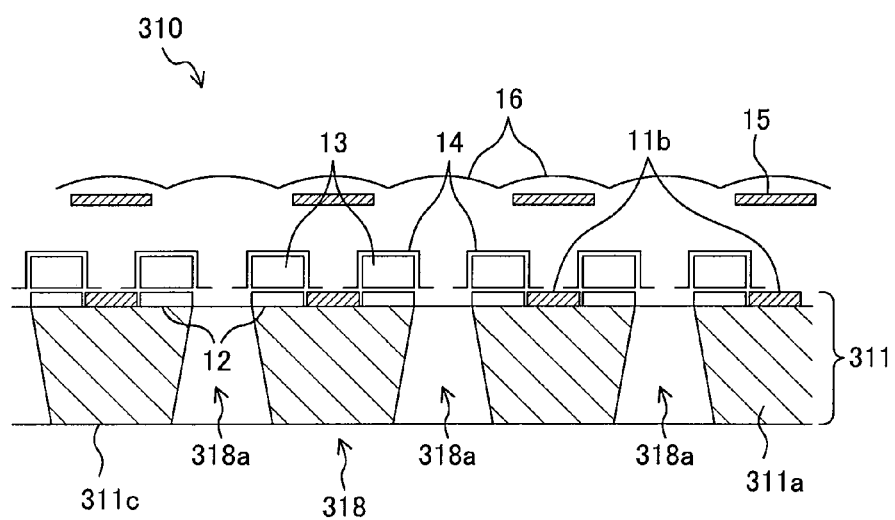
FIG. 8 is a cross-sectional view of an imaging device according to another modified example.

As described above, the configuration of an imaging device through which light passes is not limited to the configuration in which the light transmitting portions 17 are provided. As long as light passes (or transmits, as described above) through the imaging device, any configuration can be employed. For example, as shown in FIG. 8, an imaging device 310 including light passing portions 318 each of which includes a plurality of through holes 318a formed in a substrate 311a may be employed.

Each of the through holes 318a is formed so as to pass through the substrate 311a in the thickness direction. Specifically, regarding pixel regions formed on the substrate 311a so as to be arranged in matrix, when it is assumed that four pixel regions located in two adjacent columns and two adjacent rows are as a single unit, the light receiving sections 11b are provided respectively in three of the four pixel regions, and the through hole 318a is formed in the other one of the four pixels.

In the three pixel regions of the four pixel regions in which the light receiving sections 11b are provided, respectively, three color filters 15r, 15g and 15b respectively corresponding to respective colors of the three light receiving sections 11b are provided. Specifically, a green color filter 15g is provided in the light receiving section 11b located in a diagonal position to the through hole 318a, a red color filter 15r is provided in one of the light receiving sections 11b located adjacent to the through hole 318a, and a blue color filter 15b is provided in the other one of the light receiving sections 11b located adjacent to the through hole 318a. No color filter is provided in the pixel region corresponding to the through hole. 318a.

In the imaging device 10, a pixel corresponding to each through hole 318a is interpolated using outputs of the light receiving sections 11b located adjacent to the through hole 318a. Specifically, interpolation (standard interpolation) of a signal of the pixel corresponding to the through hole 318a is performed using an average value of outputs of the four light receiving sections 11b each of which is located diagonally adjacent to the through hole 318a in the pixel regions and in which the green color filters 15g are respectively provided. Alternatively, in the four light receiving sections 11b each of which is located diagonally adjacent to the through hole 318a in the pixel regions and in which the green color filters 15g are respectively provided, change in output of one pair of the light receiving sections 11b adjacent to each other in one diagonal direction is compared to change in output of the other pair of the light receiving sections 11b adjacent to each other in the other diagonal direction, and then, interpolation (slope interpolation) of a signal of a pixel corresponding to the through hole 318a is performed using an average value of outputs of the pair of the light receiving sections 11b located diagonally adjacent whose change in output is larger, or an average value of outputs of the pair of the light receiving sections 11b located diagonally adjacent whose change in output is smaller. Assume that a pixel desired to be interpolated is an edge of a focus object. If interpolation is performed using the pair of the light receiving sections 11b whose change in output is larger, the edge is undesirably caused to be loose. Therefore, the smaller change is used when each of the changes are equal to or larger than a predetermined threshold, and the larger change is used when each of the changes is smaller than the predetermine threshold so that as small change rate (slope) as possible is employed.

Then, after the interpolation of output data of the light receiving sections 11b corresponding to the through holes 318a, intensity information and color information for the pixel corresponding to each of the light receiving sections 11b are obtained using output data of each of the light receiving sections 11b, and furthermore, predetermined image processing or image synthesis is performed to generate an image signal.

Thus, it is possible to prevent a case where parts of an image at the light passing portions 318 become dark.

The imaging device 310 configured in the above-described manner allows incident light to pass therethrough via the plurality of the through holes 318a.

As described above, the imaging device 310 through which light passes can be configured by providing in the substrate 311a, instead of the light transmitting portions 17, the light passing portions 318 each of which includes the plurality of through holes 318a. Moreover, the imaging device 310 is configured so that light from the plurality of through holes 318a enters each set of the condenser lens 21a, the separator lens 23a and the line sensor 24a, and thus, advantageously, the size of one set of the condenser lens 21a, the separator lens 23a and the line sensor 24a is not restricted by the size of pixels. That is, advantageously, the size of one set of the condenser lens 21a, the separator lens 23a and the line sensor 24a does not cause any problem in increasing the resolution of the imaging device 310 by reducing the size of pixels.

The light passing portions 318 may be provided only in parts of the substrate 311a corresponding to the condenser lenses 21a and the separator lenses 23a of the phase difference detection unit 20, or may be provided throughout the substrate 311a.

Furthermore, the phase difference detection unit 20 is not limited to the above-described configuration. For example, as long as the positions of the condenser lenses 21a and the separator lenses 23a are determined so as to correspond to the light transmitting portions 17 of the imaging device 10, the phase difference detection unit 20 does not necessarily have to be configured so that the condenser lenses 21a are in close fit with the bottom plate 31a of the package 31, respectively. Alternatively, a configuration in which a condenser lens is not provided may be employed. Furthermore, as another option, a configuration in which each condenser lens and a corresponding separator lens are formed as a single unit may be employed.

Figure 9:
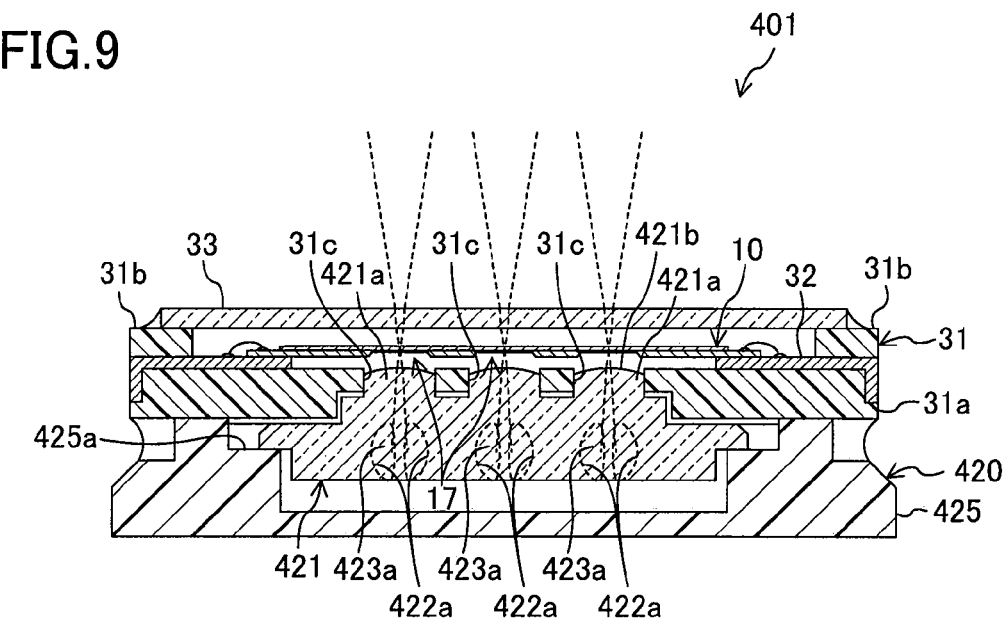
FIG. 9 is a cross-sectional view illustrating a cross section of an imaging unit according to the another modified example, corresponding to FIG. 2.
Figure 10:
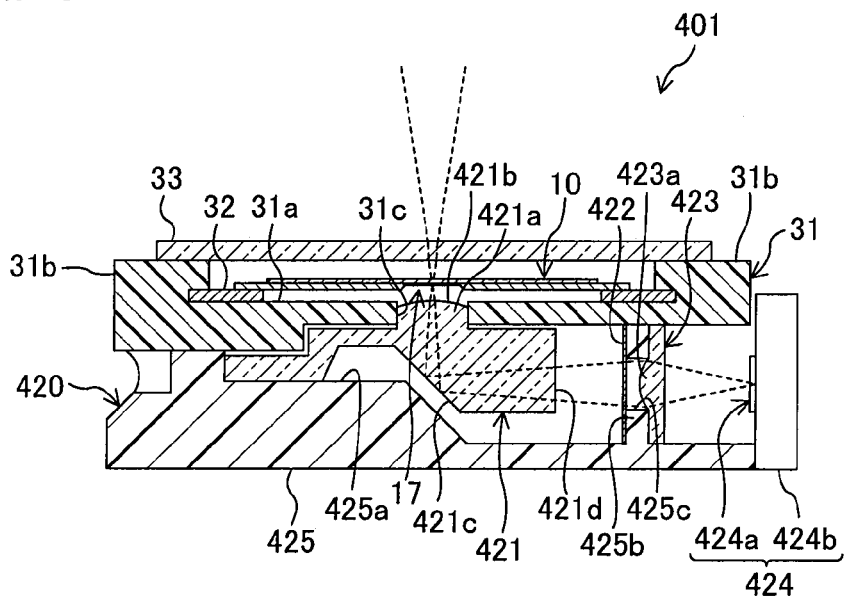
FIG. 10 is a cross-sectional view illustrating a cross section of the imaging unit of the another modified example, which is perpendicular to the cross section thereof corresponding to FIG. 2.

As another example, as shown in FIGS. 9 and 10, a phase difference detection unit 420 in which a condenser lens unit 421, a mask member 422, a separator lens unit 423 and a line sensor unit 424 are arranged in line in the parallel direction to the imaging plane of the imaging device 10 in the back side of the imaging device 10 may be employed.

Specifically, the condenser lens unit 421 is configured so that a plurality of condenser lenses 421a are integrated into a single unit, and includes an incident surface 421b, a reflection surface 421c, and an output surface 421d. That is, in the condenser lens unit 421, light collected by the condenser lenses 421a is reflected on the reflection surface 421c at an angle about 90 degrees, and is output from the output surface 421d. As a result, a light path of light which has transmitted through the imaging device 10 and has entered the condenser lens unit 421 is bent substantially orthogonally by the reflection surface 421c and is output from the output surface 421d to be directed to a separator lens 423a of the separator lens unit 423. The light which has entered the separator lens 423a transmits through the separator lens 423a and an image is formed on a line sensor 424a.

The condenser lens unit 421, the mask member 422, the separator lens unit 423 and the line sensor unit 424 configured in the above-described manner are provided within a module frame 425.

The module frame 425 is formed to have a box shape, and a step portion 425a for attaching the condenser lens unit 421 is provided in the module frame 425. The condenser lens unit 421 is attached to the step portion 425a so that the condenser lenses 421a faces outward from the module frame 425.

Moreover, in the module frame 425, an attachment wall portion 425b for attaching the mask member 422 and the separator lens unit 423 is provided so as to upwardly extend at a part facing to the output surface 421d of the condenser lens unit 421. An opening 425c is formed in the attachment wall portion 425b.

The mask member 422 is attached to a side of the attachment wall portion 425b located closer to the condenser lens unit 421. The separator lens unit 423 is attached to an opposite side of the attachment wall portion 425b to the side closer to the condenser lens unit 421.

Thus, the light path of light which has transmitted through the imaging device 10 is bent in the back side of the imaging device 10, and thus, the condenser lens unit 421, the mask member 422, the separator lens unit 423, the line sensor unit 424 and the like can be arranged in line in the parallel direction to the imaging plane of the imaging device 10, instead of in the thickness direction of the imaging device 10. Therefore, a dimension of the imaging unit 401 in the thickness direction of the imaging device 10 can be reduced. That is, an imaging unit 401 can be formed as a compact size imaging unit 401.

As described above, as long as light which has passed through the imaging device 10 can be received in the back side of the imaging device 10 and then phase difference detection can be performed thereon, a phase difference unit having any configuration can be employed.

—Operation of Camera—

The camera 100 configured in the above-described manner has various image shooting modes and functions. Various image shooting modes and functions of the camera 100 and the operation thereof at the time of each of the modes and functions will be described hereinafter.

—AF Function for Still Picture Shooting—

In still picture shooting mode, when the release button 40b is pressed halfway down, the camera 100 performs AF to focus. To perform AF, the camera 100 has four autofocus functions, i.e., phase difference detection AF, contrast detection AF, hybrid AF and object detection AF. A user can select which one of the four autofocus functions to be used by operating the AF setting switch 40c provided to the camera body 4.

Assuming that the camera system is in a normal shooting mode, the shooting operation of the camera system using each of the autofocus functions will be hereinafter described. The "normal shooting mode" means a most basic shooting mode of the camera 100 for shooting a still picture.

(Phase Difference Detection AF)

Figure 11:
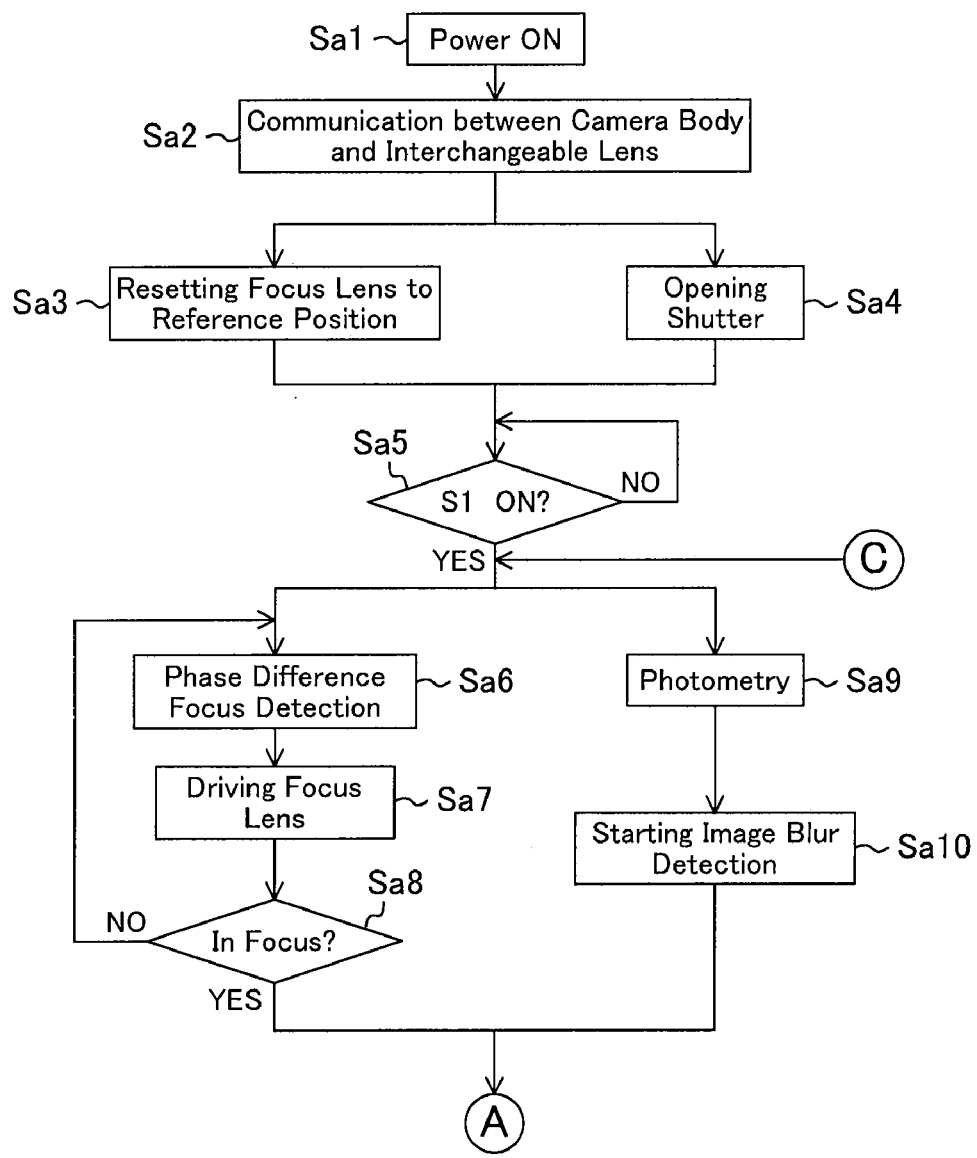
FIG. 11 is a flowchart of the steps in a shooting operation by phase difference detection AF until a release button is pressed all the way down.
Figure 12:
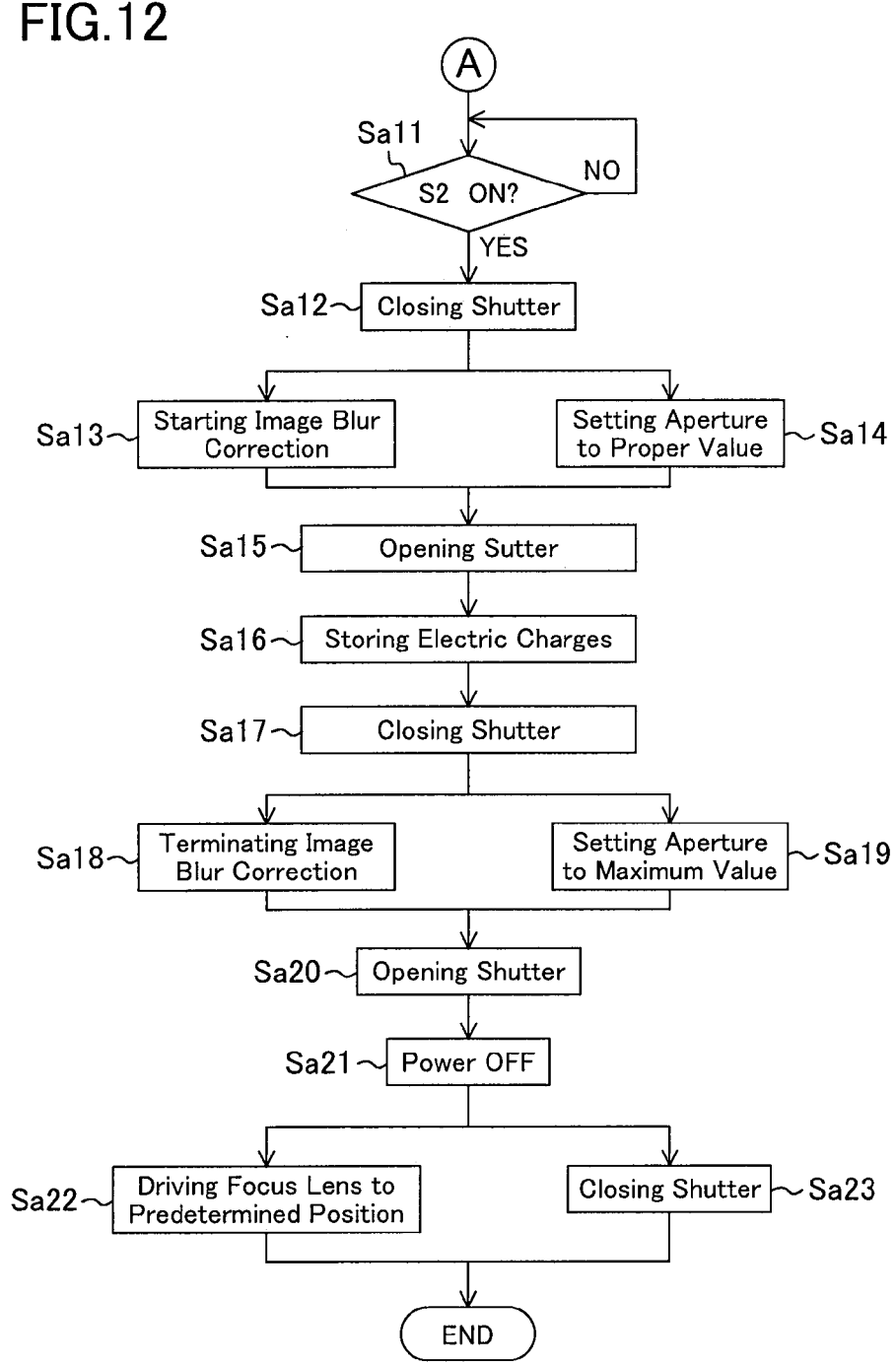
FIG. 12 is a flowchart showing the basic steps in each of shooting operations including a shooting operation by phase difference detection AF after the release button is pressed all the way down.

First, the shooting operation of the camera system using phase difference detection AF will be described with reference of FIGS. 11 and 12.

When the power switch 40a is turned ON (Step Sa1), communication between the camera body 4 and the interchangeable lens 7 is performed (Step Sa2). Specifically, power is supplied to the body microcomputer 50 and each of other units in the camera body 4 to start up the body microcomputer 50. At the same time, power is supplied to the lens microcomputer 80 and each of other units in the interchangeable lens 7 via the electric contact pieces 41a and 71a to start up the lens microcomputer 80. The body microcomputer 50 and the lens microcomputer 80 are programmed to transmit/receive information to/from each other at start-up time. For example, lens information for the interchangeable lens 7 is transmitted from the memory section of the lens microcomputer 80, and then is stored in the memory section of the body microcomputer 50.

Subsequently, the body microcomputer 50 performs Step Sa3 of positioning the focus lens group 72 at a predetermined reference position which has been determined in advance by the lens microcomputer 80, and also performs, in parallel to Step Sa3, Step Sa4 in which the shutter unit 42 is changed to an open state. Then, the process proceeds to Step Say, and the body microcomputer remains in a standby state until the release button 40b is pressed halfway down by the user.

Thus, light which has transmitted through the interchangeable lens 7 and has entered the camera body 4 passes through the shutter unit 42, transmits through the OLPF 43 serving also as an IR cutter, and then enters the imaging unit 1. An object image formed at the imaging unit 1 is displayed on the image display section 44, so that the user can see an erected image of an object via the image display section 44. Specifically, the body microcomputer 50 reads an electrical signal from the imaging device 10 via the imaging unit control section 52 at constant intervals, and performs predetermined image processing to the read electrical signal. Then, the body microcomputer 50 generates an image signal, and controls the image display control section 55 to cause the image display section 44 to display a live view image.

A part of the light which has entered the imaging unit 1 transmits through the light transmitting portions 17 of the imaging device 10, and enters the phase difference detection unit 20.

In this case, when the release button 40b is pressed halfway down (i.e., 51 switch, which is not shown in the drawings, is turned ON) by the user (Step Sa5), the body microcomputer 50 amplifies an output from the line sensor 24a of the phase difference detection unit 20, and then performs operation by the arithmetic circuit, thereby determining whether or not an object image is in focus, at which the front pin or the rear pin an object image is formed, and the Df amount (Step Sa6).

Thereafter, the body microcomputer 50 drives the focus lens group 72 via the lens microcomputer 80 in the defocus direction by the Df amount obtained in Step Sa6 (Step Sa7).

In this case, the phase difference detection unit 20 of this embodiment includes three sets of the condenser lens 21a, the mask openings 22a, separator lens 23a, and the line sensor

24a, i.e., has three distance measurement points at which phase difference detection is performed. In phase difference detection in phase difference detection AF or hybrid AF, the focus lens group 72 is driven based on an output of the line sensor 24a of one of the sets corresponding to a distance measurement point arbitrarily selected by the user.

Alternatively, an automatic optimization algorithm may be installed in the body microcomputer 50 beforehand for selecting one of the distance measurement points located closest to the camera and driving the focus lens group 72. Thus, the rate of the occurrence of focusing on the background of an object instead of the object can be reduced.

This selection of the distance measurement point is not limited to phase difference detection AF. As long as the focus lens group 72 is driven using the phase difference detection unit 20, AF using any method can be employed.

Then, whether or not an object image is in focus is determined (Step Sa8). Specifically, if the Df amount obtained based on the output of the line sensor 24a is equal to or smaller than a predetermined value, it is determined that an object image is in focus (YES), and then, the process proceeds to Step Sa11. If the Df amount obtained based on the output of the line sensor 24a is larger than the predetermined value, it is determined that an object image is not in focus (NO), the process returns to Step Sa6, and Steps Sa6 through Sa8 are repeated.

As described above, detection of a focus state and driving of the focus lens group 72 are repeated and, when the Df amount becomes equal to or smaller than the predetermined value, it is determined that an object image is in focus, and driving of the focus lens group 72 is halted.

In parallel to phase difference detection AF in Steps Sa6 through Sa8, photometry is performed (Step Sa9), and also image blur detection is started (Step Sa10).

Specifically, in Step Sa9, the light amount of light entering the imaging device 10 is measured by the imaging device 10. That is, in this embodiment, the above-described phase difference detection AF is performed using light which has entered the imaging device 10 and has transmitted through the imaging device 10, and thus, photometry can be performed using the imaging device 10 in parallel to the above-described phase difference detection AF.

More specifically, the body microcomputer 50 loads an electrical signal from the imaging device 10 via the imaging unit control section 52, and measures the intensity of an object light, based on the electrical signal, thereby performing photometry. According to a predetermined algorithm, the body microcomputer 50 determines, from a result of photometry, shutter speed and an aperture value which correspond to a shooting mode at a time of the exposure.

When photometry is terminated in Step Sa9, image blur detection is started in Step Sa10. Step Sa9 and Step Sa10 may be performed in parallel.

When the release button 40b is pressed halfway down by the user, various information displays for shooting, as well as a shooting image, appear on the image display section 44, and thus, the user can confirm each information via the image display section 44.

In Step Sa11, the body microcomputer 50 remains in a standby state until the release button 40b is pressed all the way down (i.e., a S2 switch, which is not shown in the drawings, is turned ON) by the user. When the release button 40b is pressed all the way down by the user, the body microcomputer 50 once puts the shutter unit 42 into a close state (Step Sa12). Then, while the shutter unit 42 is kept in a close state, electrical charges stored in the light receiving sections 11b of the imaging device 10 are transferred for the exposure, which will be described later.

Thereafter, the body microcomputer 50 starts correction of an image blur, based on communication information between the camera body 4 and the interchangeable lens 7 or any information specified by the user (Step Sa13). Specifically, the blur correction lens driving section 74a in the interchangeable lens 7 is driven based on information of the blur detection section 56 in the camera body 4. According to the intention of the user, any one of (i) use of the blur detection section 84 and the blur correction lens driving section 74a in the interchangeable lens 7, (ii) use of the blur detection section 56 and the blur correction unit 45 in the camera body 4, and (iii) use of the blur detection section 84 in the interchangeable lens 7 and the blur correction unit 45 in the camera body 4 can be selected.

By starting driving of the image blur correction sections at a time when the release button 40b is pressed halfway down, the movement of an object desired to be in focus is reduced, and thus, phase difference detection AF can be performed with accuracy.

The body microcomputer 50 stops down, in parallel to starting of image blur correction, the aperture section 73 by the lens microcomputer 80 so as to attain an aperture value calculated based on a result of photometry in Step Sa9 (Step Sa14).

Thus, when the image blur correction is started and the aperture operation is terminated, the body microcomputer 50 puts the shutter unit 42 into an open state, based on the shutter speed obtained from the result of photometry in Step Sa9 (Step Sa15). In the above-described manner, the shutter unit 42 is put into an open state, so that light from the object enters the imaging device 10, and electrical charges are stored in the imaging device 10 only for a predetermined time (Step Sa16).

The body microcomputer 50 puts the shutter unit 42 into a close state, based on the shutter speed, to terminate the exposure (Step Sa17). After the termination of the exposure, in the body microcomputer 50, image data is read out from the imaging unit 1 via the imaging unit control section 52 and then, after performing predetermined image processing to the image data, the image data is output to the image display control section 55 via the image reading/recording section 53. Thus, a shooting image is displayed on the image display section 44. The body microcomputer 50 stores the image data in the image storage section 58 via the image recording control section 54, as necessary.

Thereafter, the body microcomputer 50 terminates image blur correction (Step Sa18), and releases the aperture section 73 (Step Sa19). Then, the body microcomputer 50 puts the shutter unit 42 into an open state (Step Sa20).

When a reset operation is terminated, the lens microcomputer 80 notifies the body microcomputer 50 of the termination of the reset operation. The body microcomputer 50 waits for receiving reset termination information from the lens microcomputer 80 and the termination of a series of processings after the exposure. Thereafter, the body microcomputer 50 confirms that the release button 40b is not in a pressed state, and terminates a shooting sequence. Then, the process returns to Step Say, and the body microcomputer 50 remains in a standby state until the release button 40b is pressed halfway down.

When the power switch 40a is turned OFF (Step Sa21), the body microcomputer 50 shifts the focus lens group 72 to a predetermined reference position (Step Sa22), and puts the shutter unit 42 into a close state (Step Sa23). Then, respective operations of the body microcomputer 50 and other units in the camera body 4, and the lens microcomputer 80 and other units in the interchangeable lens 7 are halted.

As described above, in a shooting operation of the camera system using phase difference detection AF, photometry is performed by the imaging device 10 in parallel to autofocusing based on the phase difference detection unit 20. Specifically, the phase difference detection unit 20 receives light which transmits through the imaging device 10 to obtain defocus information, and thus, whenever the phase difference detection unit 20 obtains defocus information, the imaging device 10 is irradiated with light from an object. Therefore, photometry is performed using light which transmits through the imaging device 10 in autofocusing. By doing so, a photometry sensor does not have to be additionally provided, and photometry can be performed before the release button 40b is pressed all the way down, so that a time (hereinafter also referred to as a "release time lag") from a time point when the release button 40b is pressed all the way down to a time point when the exposure is terminated can be reduced.

Moreover, even in a configuration in which photometry is performed before the release button 40b is pressed all the way down, by performing photometry in parallel to autofocusing, increase in processing time after the release button 40b is pressed halfway down can be prevented. In such a case, a mirror for guiding light from an object to a photometry sensor or a phase difference detection unit does not have to be provided.

Conventionally, a part of light from an object to an imaging device is guided to a phase difference detection unit provided outside the imaging device by a mirror or the like. In contrast, according to this embodiment, a focus state can be detected by the phase difference detection unit 20 using light guided to the imaging unit 1 as it is, and thus, the focus state can be detected with very high accuracy.

(Contrast Detection AF)

Figure 13:
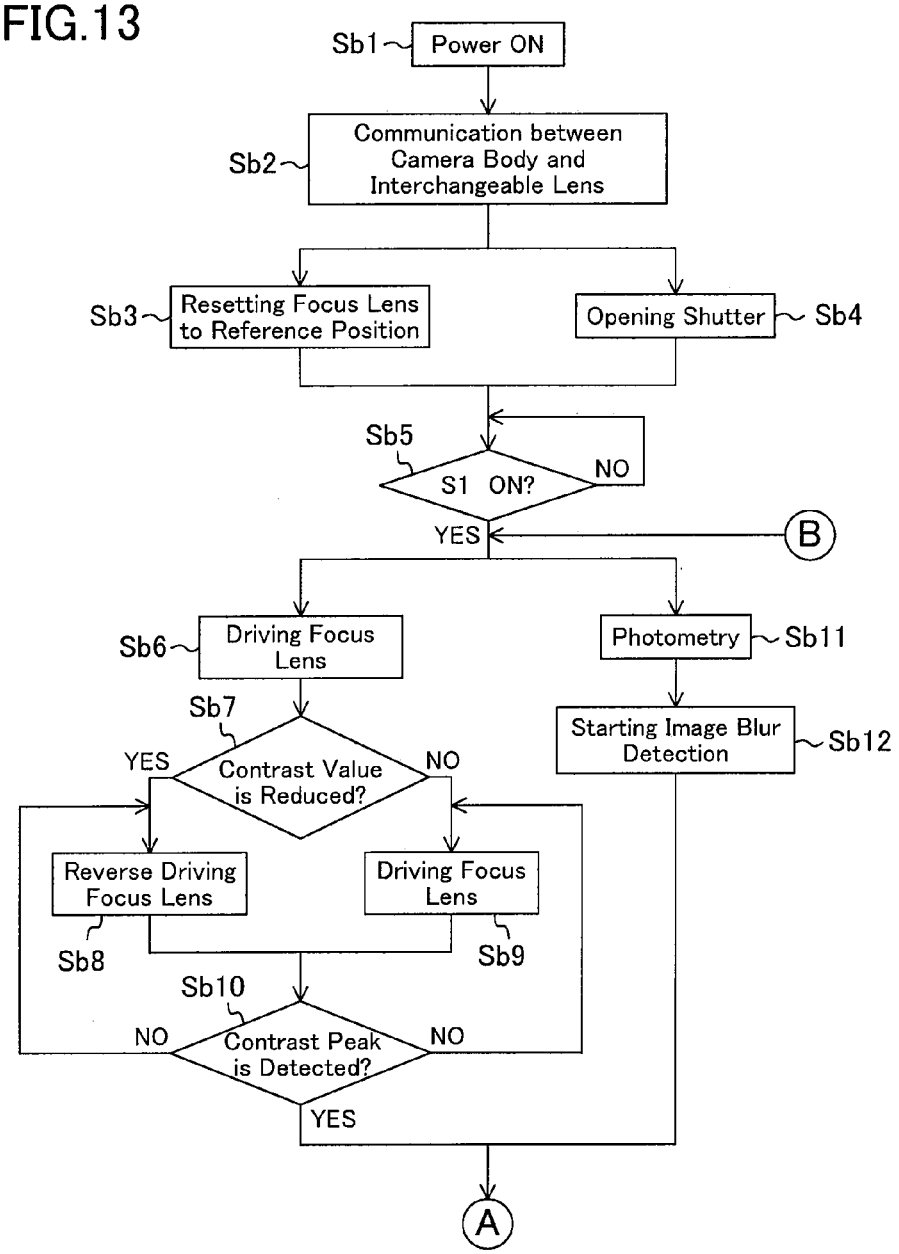
FIG. 13 is a flowchart of the steps in a shooting operation by contrast detection AF until a release button is pressed all the way down.

Next, the shooting operation of the camera system using contrast detection AF will be described with reference to FIG. 13.

When the power switch 40a is turned ON (Step Sb1), communication between the camera body 4 and the interchangeable lens 7 is performed (Step Sb2), the focus lens group 72 is positioned at a predetermined reference position (Step Sb3), the shutter unit 42 is put into an open state (Step Sb4) in parallel to Step Sb3, and then, the body microcomputer 50 remains in a standby state until the release button 40b is pressed halfway down (Step Sb5). The above-described steps, i.e., Step Sb1 through Step Sb5 are the same as Step Sa1 through Step Sa5.

When the release button 40b is pressed halfway down by the user (Step Sb5), the body microcomputer 50 drives the focus lens group 72 via the lens microcomputer 80 (Step Sb6). Specifically, the body microcomputer 50 drives the focus lens group 72 so that a focal point of an object image is moved in a predetermined direction (e.g., toward an object) along the optical axis.

Then, the body microcomputer 50 obtains a contrast value for the object image, based on an output from the imaging device 10 received by the body microcomputer 50 via the imaging unit control section 52 to determine whether or not the contrast value is reduced (Step Sb7). If the contrast value is reduced (YES), the process proceeds to Step Sb8. If the contrast value is increased (NO), the process proceeds to Step Sb9.

Reduction in contrast value means that the focus lens group 72 is driven in an opposite direction to the direction in which the object image is brought in focus. Therefore, when the contrast value is reduced, the focus lens group 72 is reversely driven so that the focal point of the object image is moved in an opposite direction to the predetermined direction (e.g., toward the opposite side to the object) along the optical axis (Step Sb8). Thereafter, whether or not a contrast peak is detected is determined (Step Sb10). During a period in which the contrast peak is not detected (NO), reverse driving of the focus lens group 72 (Step Sb8) is repeated. When a contrast peak is detected (YES), reverse driving of the focus lens group 72 is halted, and the focus lens group 72 is moved to a position where the contrast value has reached the peak. Then, the process proceeds to Step Sa11.

On the other hand, when the focus lens group 72 is driven in Step Sb6 and the contrast value is increased, the focus lens group 72 is driven in the direction in which the object image is brought in focus. Therefore, driving of the focus lens group 72 is continued (Step Sb9), and whether or not a peak of the contrast value is detected is determined (Step Sb10). During a period in which the contrast peak is not detected (NO), driving of the focus lens group 72 (Step Sb9) is repeated. When a contrast peak has been detected (YES), driving of the focus lens group 72 is halted, and the focus lens group 72 is moved to a position where the contrast value has reached the peak. Then, the process proceeds to Step Sa11.

As has been described, in the contrast detection method, the focus lens group 72 is driven tentatively (Step Sb6). Then, if the contrast value is reduced, the focus lens group 72 is reversely driven to search for the peak of the contrast value (Steps Sb8 and Sb10). If the contrast value is increased, driving of the focus lens group 72 is continued to search for the peak of the contrast value (Steps Sb9 and Sb10). Calculation of the contrast value may be performed for an entire object image captured by the imaging device 10, or may be performed for a part of the object image. Specifically, the body microcomputer 50 may calculate the contrast value, based on an output from a pixel in an area of the imaging device 10. For example, the body microcomputer 50 may calculate the contrast value, based on an image signal corresponding to a contrast AF area determined by object detection AF, which will be described later.

In parallel to this contrast detection AF (Steps Sb6 through Sb10), photometry is performed (Step Sb11) and image blur detection is started (Step Sb12). Steps Sb11 and Sb12 are the same as Step Sa9 and Step Sa10 in phase difference detection AF.

In Step Sa11, the body microcomputer 50 remains in a standby state until the release button 40b is pressed all the way down by the user. A flow of steps after the release button 40b is pressed all the way down is the same as that of phase difference detection AF.

In this contrast detection AF, a contrast peak can be directly obtained, and thus, unlike phase difference detection AF, various correction operations such as release back correction (for correcting an out-of-focus state due to the degree of aperture) and the like are not necessary, so that highly accurate focusing performance can be achieved. However, to detect the peak of a contrast value, the focus lens group 72 has to be driven until the focus lens group 72 is moved so as to go over the peak of the contrast value once. Accordingly, the focus lens group 72 has to be once moved to a position where the focus lens group 72 goes over the peak of the contrast value and then be moved back to a position corresponding to the peak of the contrast value, and thus, a backlash generated in a focus lens group driving system due to the operation of driving the focus lens group 72 in back and forth directions has to be removed.

(Hybrid AF)

Subsequently, the shooting operation of the camera system using hybrid AF will be described with reference to FIG. 14.

Steps (Step Sc1 through Step Sc5) from the step in which the power switch 40a is turned ON to the step in which a release button 40b is pressed halfway down are the same as Step Sa1 through Step Sa5 in phase difference detection AF.

When the release button 40b is pressed halfway down by the user (Step Sc5), the body microcomputer 50 amplifies an output from the line sensor 24a of the phase difference detection unit 20, and then performs an operation by the arithmetic circuit, thereby determining whether or not an object image is in focus (Step Sc6). Furthermore, the body microcomputer 50 determines at which the front pin or the rear pin an object image is formed and the Df amount, and then, obtains defocus information (Step Sc7). Thereafter, the process proceeds to Step Sc10. In this case, all of the plurality of distance measurement points may be used or selected one(s) of the distance measurement points may be used.

In parallel to Steps Sc6 and Sc7, photometry is performed (Step Sc8) and image blur detection is started (Step Sc9). Step Sc6 and Step Sc7 are the same as Step Sa9 and Step Sa10 in phase difference detection AF. Thereafter, the process proceeds to Step Sc10. Note that, after Step Sc9, the process may also proceed to Step Sa11, instead of Sc10.

As decried above, in this embodiment, using light which has entered the imaging device 10 and has transmitted through the imaging device 10, the above-described focus detection based on a phase difference is performed. Thus, in parallel to the above-describe focus detection, photometry can be performed using the imaging device 10.

In Step Sc10, the body microcomputer 50 drives the focus lens group 72, based on the defocus information obtained in Step Sc7.

The body microcomputer 50 determines whether or not a contrast peak is detected (Step Sc11). During a period in which the contrast peak is not detected (NO), driving of the focus lens group 72 (Step Sc10) is repeated. When a contrast peak is detected (YES), driving of the focus lens group 72 is halted, and the focus lens group 72 is moved to a position where the contrast value has reached the peak. Then, the process proceeds to Step Sa11.

Specifically, in Step Sc10 and Step Sc11, it is preferable that, based on the defocus direction and the defocus amount calculated in Step Sc7, after the focus lens group 72 is moved at high speed, the focus lens group 72 is moved at lower speed than the high speed and a contrast peak is detected.

In this case, it is preferable that an moving amount of the focus lens group 72 which is moved based on the calculated defocus amount (i.e., a position to which the focus lens group 72 is moved) is set to be different from that in Step Sa7 in phase difference detection AF. Specifically, in Step Sa7 in phase difference detection AF, the focus lens group 72 is moved to a position which is estimated as a focus position, based on the defocus amount. In contrast, in Step Sc10 in hybrid AF, the focus lens group 72 is driven to a position shifted forward or backward from the position estimated as a focus position, based on the defocus amount. Thereafter, in hybrid AF, a contrast peak is detected while the focus lens group 72 is driven toward the position estimated as the focus position.

Calculation of the contrast value may be performed for an entire object image captured by the imaging device 10, or may be performed for a part of the object image. Specifically, the body microcomputer 50 may calculate the contrast value, based on outputs from pixels in an area of the imaging device 10. For example, the body microcomputer 50 may calculate the contrast value, based on an image signal corresponding to a contrast AF area determined by object detection AF, which will be described later.

In Step Sa11, the body microcomputer 50 remains in a standby state until the release button 40b is pressed all the way down by the user. A flow of steps after the release button 40b is pressed all the way down is the same as that of phase difference detection AF.

As has been described, in hybrid AF, first, defocus information is obtained by the phase difference detection unit 20, and the interchangeable lens 7 is driven based on the defocus information. Then, a position of the focus lens group 72 at which a contrast value calculated based on an output from the imaging device 10 reaches a peak is detected, and the focus lens group 72 is moved to the position. Thus, defocus information can be detected before driving the focus lens group 72, and therefore, unlike contrast detection AF, the step of tentatively driving the focus lens group 72 is not necessary. This allows reduction in processing time for autofocusing. Moreover, an object image is brought in focus by contrast detection AF eventually, and therefore, particularly, an object having a repetitive pattern, an object having extremely low contrast, and the like can be brought in focus with higher accuracy than in phase difference detection AF.

Since defocus information is obtained by the phase difference detection unit 20 using light which has transmitted through the imaging device 10, photometry can be performed by the imaging device 10 in parallel to the step of obtaining defocus information by the phase difference detection unit 20 although hybrid AF includes phase difference detection. As a result, a mirror for dividing a part of light from an object to detect a phase difference does not have to be provided, and a photometry sensor does not have to be additionally provided. Furthermore, photometry can be performed before the release button 40b is pressed all the way down. Therefore, a release time lag can be reduced. In the configuration in which photometry is performed before the release button 40b is pressed all the way down, photometry can be performed in parallel to the step of obtaining defocus information, thereby preventing increase in processing time after the release button 40b is pressed halfway down.

(Object Detection AF)

Figure 15:
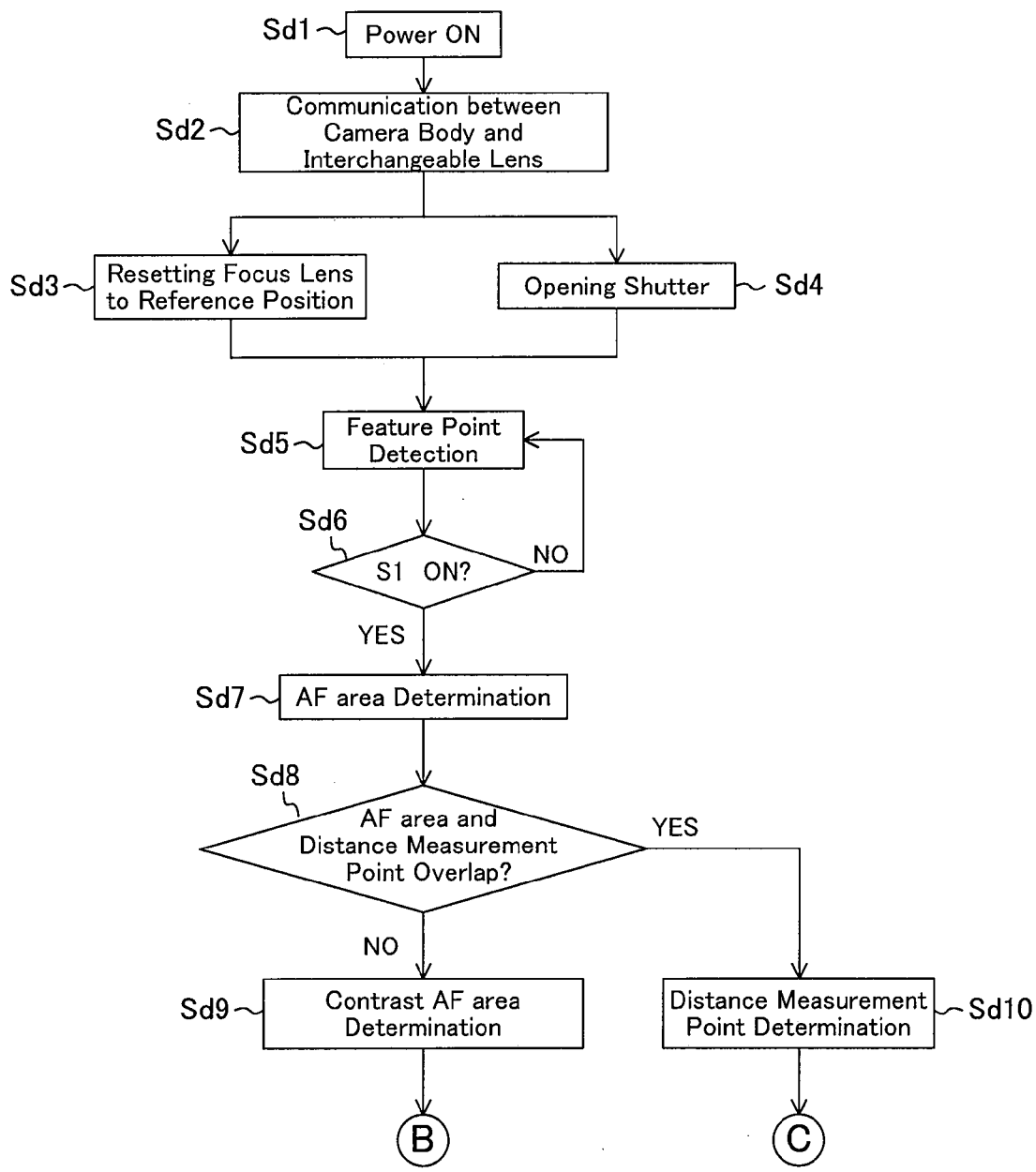
FIG. 15 is a flowchart of the steps in a shooting operation by object detection AF until AF method is determined.

Subsequently, object detection AF in which a specific object is detected and AF is performed to the object will be described. FIG. 15 is a flowchart of the steps in a shooting operation by object detection AF until AF method is determined.

The operation (Step Sd1 through Step Sd4) from a step in which the power switch 40a is turned ON to a step right before feature point detection (Step Sd5) are the same as Step Sa1 through Step Sa4 in phase difference detection AF.

Light which has transmitted through the interchangeable lens 7 and has entered the camera body 4 passes through the shutter unit 42, further transmits through the OLPF 43 serving also as an IR cutter, and then enters the imaging unit 1. An object image formed at the imaging unit 1 is displayed on the image display section 44, and thus, the user can see an erected image of an object via the image display section 44. Specifically, the body microcomputer 50 reads an electrical signal from the imaging device 10 via the imaging unit control section 52 at constant intervals, and performs predetermined image processing to the read electrical signal. Then, the body microcomputer 50 generates an image signal, and controls the image display control section 55 to cause the image display section 44 to display a live view image.

The body microcomputer 50 detects a feature point of the object, based on the image signal (Step Sd5). Specifically, the body microcomputer 50 detects, based on the image signal, whether or not a feature point which has been set in advance exits in the object and, if the feature point exists in the object, detects the position and area of the feature point. For example, a feature point may be the color, shape and the like of an object. For example, as a feature point, a face of an object may be detected. For example, a general shape or color of a face may be a feature point which has been set in advance. Moreover, for example, the color, shape or the like of a part of an object selected by the user from a live view image displayed in the image display section 44 may be set as a feature point in advance. A feature point is not limited to these examples. In the above-described manner, the body microcomputer 50 functions as an object detection section for detecting a specific object.

Feature point detection (Step Sd5) is continuously performed until the release button 40b is pressed halfway down by the user (i.e., the S1 switch, which is not shown in the drawings, is turned ON). The body microcomputer 50 controls the image display control section 55 to cause the image display section 44 to indicate the position and area of the detected feature point by in an indication form such as, for example, an indication frame or the like.

In this case, when the release button 40b is pressed halfway down by the user (i.e., the S1 switch, which is not shown in the drawings, is turned ON) (Step Sd6), the body microcomputer 50 determines an AF area (Step Sd7). Specifically, the body microcomputer 50 determines an area defined by the position and area of the feature point which has been detected right before Step Sd7 as the AF area.

Next, the body microcomputer 50 determines whether or not the AF area overlaps a distant measurement point (Step Sd8). As described above, the imaging unit 1 can perform the exposure of the imaging device 10 simultaneously with the exposure of the phase difference detection unit 20. The phase difference detection unit 20 has a plurality of distance measurement points. In the nonvolatile memory 50a, the plurality of distance measurement points and corresponding positions and areas on the imaging plane of the imaging device 10 are stored. More specifically, in the nonvolatile memory 50a, the positions and areas of the plurality of distance measurement points, and corresponding pixels of the imaging device 10 are stored. That is, a distance measurement point and an area (a group of corresponding pixels) on the imaging plane corresponding to the distance measurement point receive the same object light. Specifically, the body microcomputer 50 determines whether or not the AF area overlaps an area corresponding to a distance measurement point.

When the body microcomputer 50 determines that the AF area does not overlap a distance measurement point (NO in Step Sd8), the body microcomputer 50 defines a contrast AF area for performing contrast detection AF (Step Sd9). Specifically, for example, the body microcomputer 50 defines the AF area as the contrast AF area. Then, the body microcomputer 50 performs the operation (Step Sd6 through Step Sd12) which is to be performed after the S1 switch is turned ON in contrast detection AF of FIG. 13. In this case, the body microcomputer 50 obtains a contrast value, based on a corresponding part of the image signal to the contrast AF area.

When the body microcomputer 50 determines that the AF area overlaps a distance measurement point (YES in Step Sd8), a distance measurement point to be used is selected. Specifically, the body microcomputer 50 selects a distance measurement point overlapping the AF area. Then, the body microcomputer 50 performs the operation (Step Sa6 through Step Sa10) which is to be performed after the S1 switch is turned ON in phase difference detection AF shown in FIG. 11.

In this case, the body microcomputer 50 performs phase difference focus detection using the selected distance measurement point.

Figure 14:
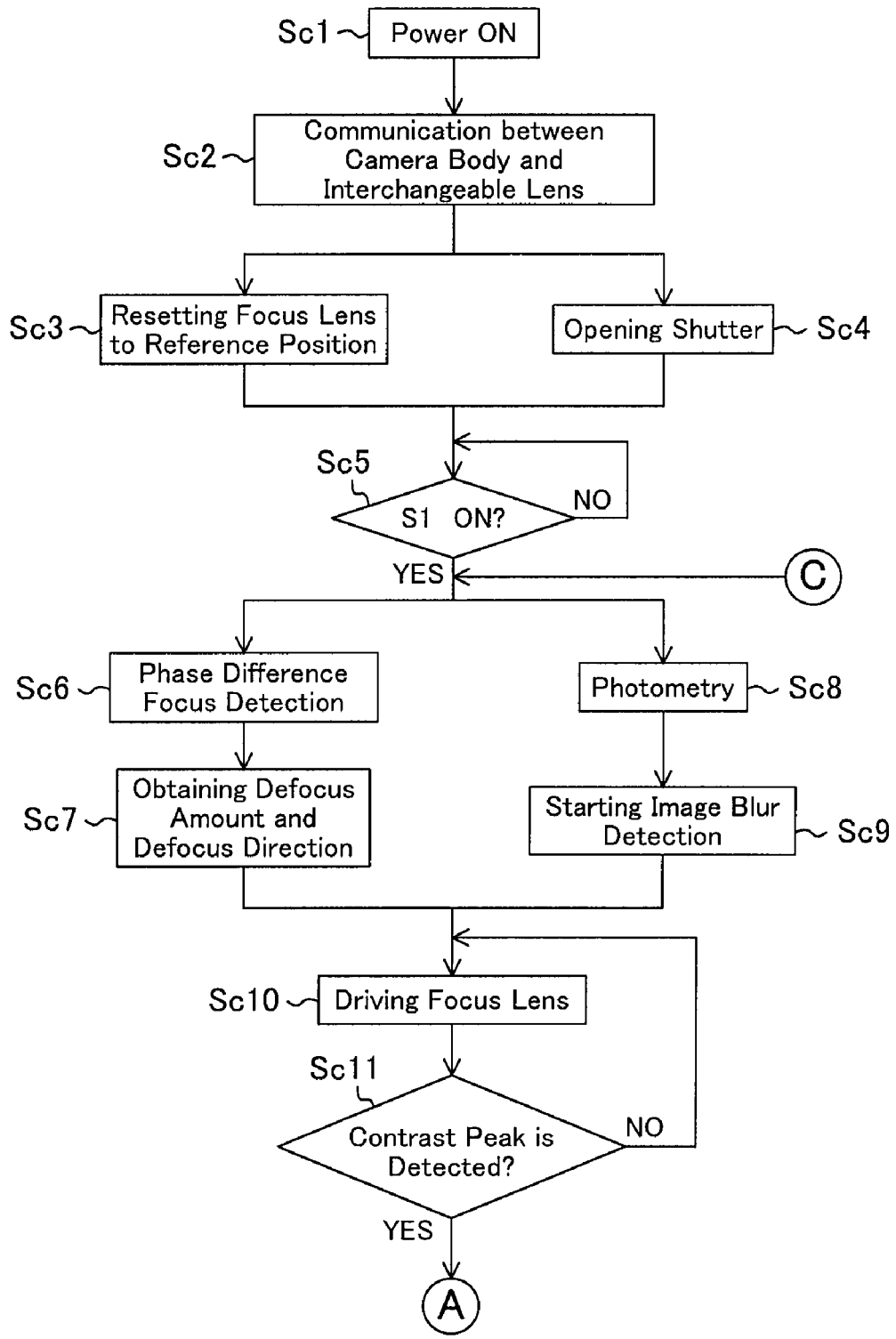
FIG. 14 is a flowchart of the steps in a shooting operation by hybrid AF until a release button is pressed all the way down.

The body microcomputer 50 may be configured to perform the operation (Step Sa6 through Step Sa10) which is to be performed after the S1 switch is turned ON in hybrid detection AF shown of FIG. 14. In this case, the body microcomputer 50 performs phase difference focus detection using the selected distance measurement point and obtains a contrast value, based on a corresponding part of image signal to the contrast AF area.

A specific example of object detection AF will be described using FIGS. 16A and 16B. An object area frame 1601 shown in each of FIGS. 16A and 16B indicates an area of an object to be captured in the imaging device 10. The inside of the object area frame 1601 corresponds to an object. Distance measurement point frames 1602, 1603 and 1604 indicated by dashed lines show respective positions of distance measurement points. Phase difference focus detection can be performed for objects in the distance measurement point frames 1602, 1603 and 1604. An example in which a face is detected as a feature point of an object will be described.

Figure 16B:
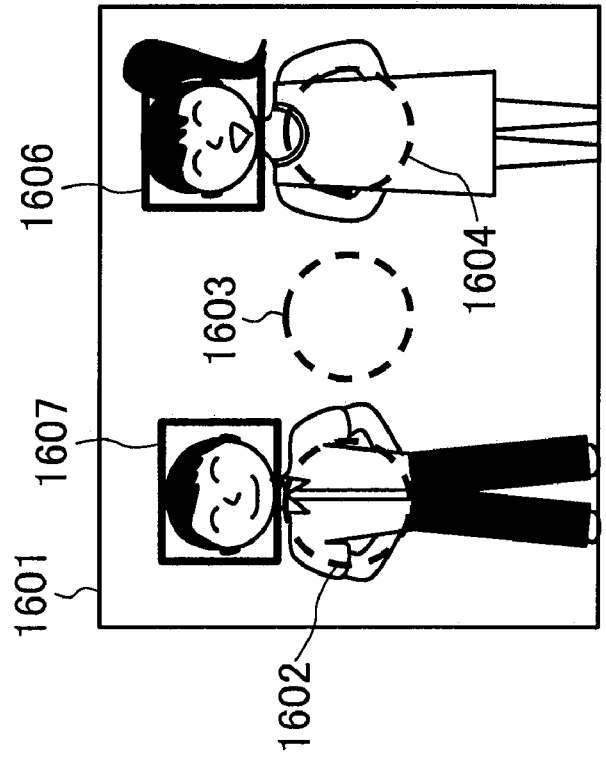
FIGS. 16A and 16B are illustrations showing specific examples of object detection AF.
Figure 16A:
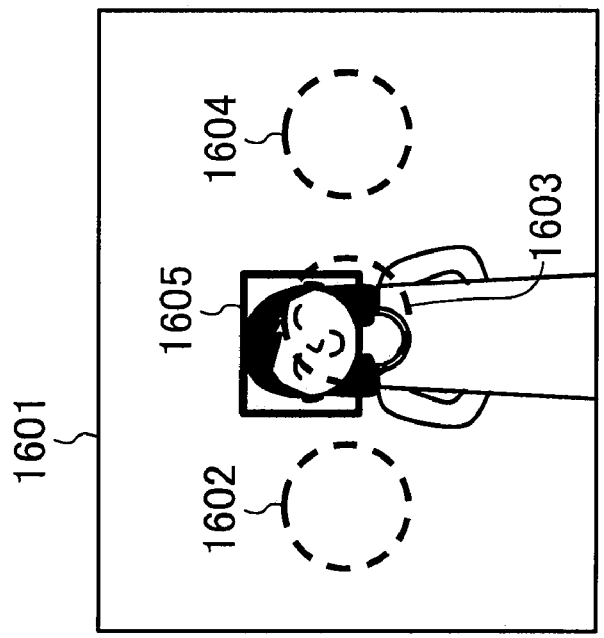

In an example shown in FIG. 16A, the body microcomputer 50 detects a face as a feature point, based on an image signal. A face frame 1605 indicates an area of a detected face. The body microcomputer 50 sets the area of the face frame 1605 as an AF area. In this example, the AF area 1605 overlap a distance measurement point corresponding to the distance measurement point frame 1603. The body microcomputer 50 performs phase difference detection AF using the distance measurement point corresponding to the distance measurement point frame 1603. Alternatively, the body microcomputer 50 performs hybrid AF using phase difference focus detection with the distance measurement point corresponding to the distance measurement point frame 1603 and contrast detection based on the image signal corresponding to the AF area 1605. Thus, AF can be performed fast to the detected feature point (face).

In an example shown in FIG. 16B, the body microcomputer 50 detects a face as a feature point, based on an image signal. Face frames 1606 and 1607 indicate respective areas of detected faces. The body microcomputer 50 sets the areas of the face frames 1606 and 1607 as AF areas. In this example, the AF areas 1606 and 1607 do not overlap distance measurement points respectively corresponding to the distance measurement point frames 1602, 1603 and 1604. Thus, the body microcomputer 50 determines the face frames 1606 and 1607 as AF areas, and furthermore, determines the face frames 1606 and 1607 as contrast AF areas. Then, the body microcomputer 50 performs contrast detection AF based on respective contrast values of the contrast AF areas 1606 and 1607.

As a modified example of object detection AF, for example, as shown in FIG. 16B, it is assumed that faces of objects are detected as feature points and some of the distance measurement points 1602, 1603 and 1604 located in lower parts than AF areas 1606 and 1607 determined based on areas of the faces in the vertical direction overlaps associated ones of the AF areas in the horizontal direction of objects. In this case, phase difference detection AF may be performed using overlapping distance measurement points, i.e., the distance measurement points 1602 and 1604. Moreover, hybrid AF using phase difference focus detection with the overlapping distance measurement points 1602 and 1604 and contrast detection based on the image signal corresponding to each of the AF areas 1606 and 1607 may be performed. This is because it is highly possible that a distance measurement point overlaps a body of an object because usually the body appears vertically below a face of the object. To detect the vertical direction and the horizontal direction of an object, an attitude detection section such as, for example, an acceleration sensor for detecting an attitude of a camera may be provided.

—Moving Picture Shooting Mode—

Next, the function of the camera 100 in moving picture shooting will be described. When a moving picture shooting mode is selected by the moving picture shooting mode selection switch 40d, the body control section 5 controls the camera 100 so that the camera 100 performs an operation of shooting a moving picture.

The moving picture shooting mode includes a plurality of shooting modes in which different moving picture shooting operations are performed respectively. Specifically, the plurality of moving picture shooting modes include a macro mode, a landscape mode, a spotlight mode, a low light mode, and a normal mode.

(Start of Moving Picture Shooting Mode)

Figure 17:
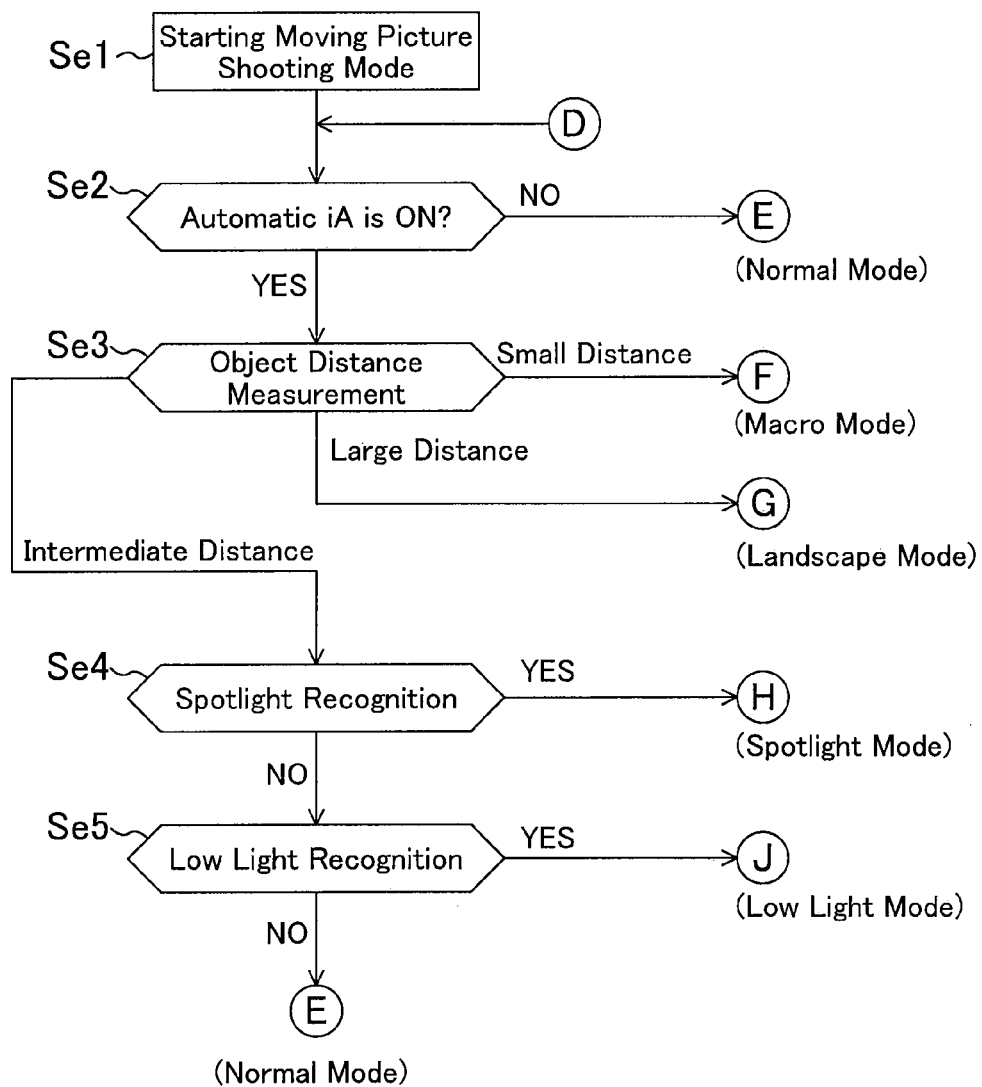
FIG. 17 is a flowchart of the steps in automatic selection of a picture shooting mode selection.

FIG. 17 is a flowchart of the steps in a moving picture shooting mode.

When the moving picture shooting mode selection switch 40d is operated with the camera 100 in an ON state and then the moving picture shooting mode is set, the moving picture shooting mode is started (Step Se1). Also, when the moving picture shooting mode selection switch 40d is operated and then the camera 100 is turned ON in the moving picture shooting mode, the moving picture shooting mode is started (Step Se1). When the moving picture shooting mode is started, a zoom lens group/focus lens group is set at an initial position, a white balance is obtained, display of a live view image is started, photometry is performed, or like operation is performed.

(Command for Start/Stop of Moving Picture Recording)

When the REC button 40e is operated by a user, recording of a moving picture image is started. Specifically, according to commands of the body microcomputer 50, the imaging unit control section 52 performs A/D conversion of an electrical signal from the imaging unit 1 to output the converted electrical signal to the body microcomputer 50 at intervals. The body microcomputer 50 performs predetermined image processing, in-frame compression or inter-frame compression, and the like to the received electrical signal to generate moving picture data. Then, the body microcomputer 50 transmits the moving picture data to the image reading/recording section 53 to start storing the image signal in the image storage section 58.

The body microcomputer also performs predetermined image processing to the received electrical signal to generate an image signal. Then, the body microcomputer 50 transmits the image signal to the image reading/recording section 53 to instruct the image recording control section 54 to display an image. The image display control section 55 controls the image display section 44 based on the transmitted image signal to cause the image display section 44 to successively display images, thereby displaying a moving picture.

When the REC button 40e is operated again during a recording operation of recording a moving picture image, the body microcomputer 50 stops the recording operation of the moving picture image.

The start/stop sequence of moving picture image recording can be inserted in any part of the sequence of the moving picture shooting mode.

Still picture shooting may be performed by operating, in a preparation state for moving picture recording, the release button 40b which triggers still picture shooting.

(Auto-Selection Function of Picture Shooting Mode)

FIG. 17 is a flowchart of the steps in automatic picture shooting mode selection. The auto selection function of picture shooting mode will be hereinafter referred to as "automatic iA" for convenience.

After the moving picture shooting mode is started (Step Se1), or after the shooting mode is changed to (D) by executing AF, which will be described later, the body microcomputer 50 determines whether or not "automatic iA" is ON (Step Se2). If "automatic iA" is OFF, the shooting mode is changed to a normal mode (E).

If "auto automatic iA" is ON, an approximate distance to an object is measured based on a current position of the focus lens group 72 and defocus information (Step Se3). More specifically, the body microcomputer 50 can calculate a distance to an object which is currently in focus, i.e., an object point distance, based on the current position of the focus lens group 72. The body microcomputer 50 can calculate, based on defocus information, where the focus lens group 72 should be moved in order to bring an object for which defocus information has been obtained in focus. Thus, the body microcomputer 50 calculates, as a distance to an object for which defocus information has been obtained, an object point distance corresponding to a position (target position) to which the focus lens group 72 should be moved. In this embodiment, since an object is in focus in the entire moving picture shooting mode, the object point distance is substantially equal to an object distance. Therefore, the body microcomputer 50 may calculate an object point distance, based on the position of the focus lens group 72 to use the object point distance as the object distance.

In Step Se3, if it is determined that the measured object distance is smaller than a predetermined first distance, the shooting mode is changed to a macro mode (F).

In Step Se3, if it is determined that the measured object distance is larger than a predetermined second distance which is a larger than the first distance, the shooting mode is changed to a landscape mode (G).

When the measured object distance is between the first distance and second distance, mode determinations are sequentially performed based on an image signal from the imaging device 10. For example, in this embodiment, when a photometry distribution for an object image projected on the imaging plane of the imaging device 10 is obtained based on an image signal and it is confirmed that the intensity of the imaging plane around the center thereof is different from the intensity thereof at other parts by a predetermined value or larger, the existence of a spotlight is recognized, as in case of wedding or on-stage, (Step Se4). When the existence of the spotlight is recognized, the shooting mode is changed to a spotlight mode (H). When light such as a spotlight is on, the light amount is extremely small around the spotlight. Thus, when the light amount is averaged over the entire imaging plane to determine the exposure, unnecessarily overexposure of a part irradiated with a spotlight is caused and, as a result, overexposure of a person or the like occurs. To eliminate or reduce such problems, in the spotlight mode, the body microcomputer 50 performs control to reduce an exposure level.

When the body microcomputer 50 determines that there is no spotlight in Step Se4, the process proceeds to Step Se5, and whether or not a current condition is a low light state where the light amount is small is determined based on photometric data of the object image projected on the imaging device 10. If it is determined that the condition is a low light state, the shooting mode is changed to a low light mode (J). The low light state is a state where the object image locally includes strong light such as light incoming through a window or light of an electric lamp, for example, when shooting is performed in a room during daytime or the like. In such an illumination environment, the light amount is averaged over the entire imaging plane including locally strong light such as light incoming through a window or light of an electric lamp to determine the exposure, and thus, a main object might be captured dark. To solve this problem, in the low light mode, the body microcomputer 50 performs control so that the exposure is adjusted according to the photometry distribution.

FIG. 17 shows the operation up to selecting the low light mode. Besides the above-described moving picture shooting modes, the shooting mode may be changed to other picture shooting modes such as a sports mode, which can be analogized based on an image signal, defocus information and the like.

If it is determined, based on determination for changing shooting mode to the above-described various moving picture shooting modes, that a condition does not correspond to any of the moving picture shooting mode, the shooting mode is changed to the normal mode (E).

(Normal Mode AF)

Figure 18:
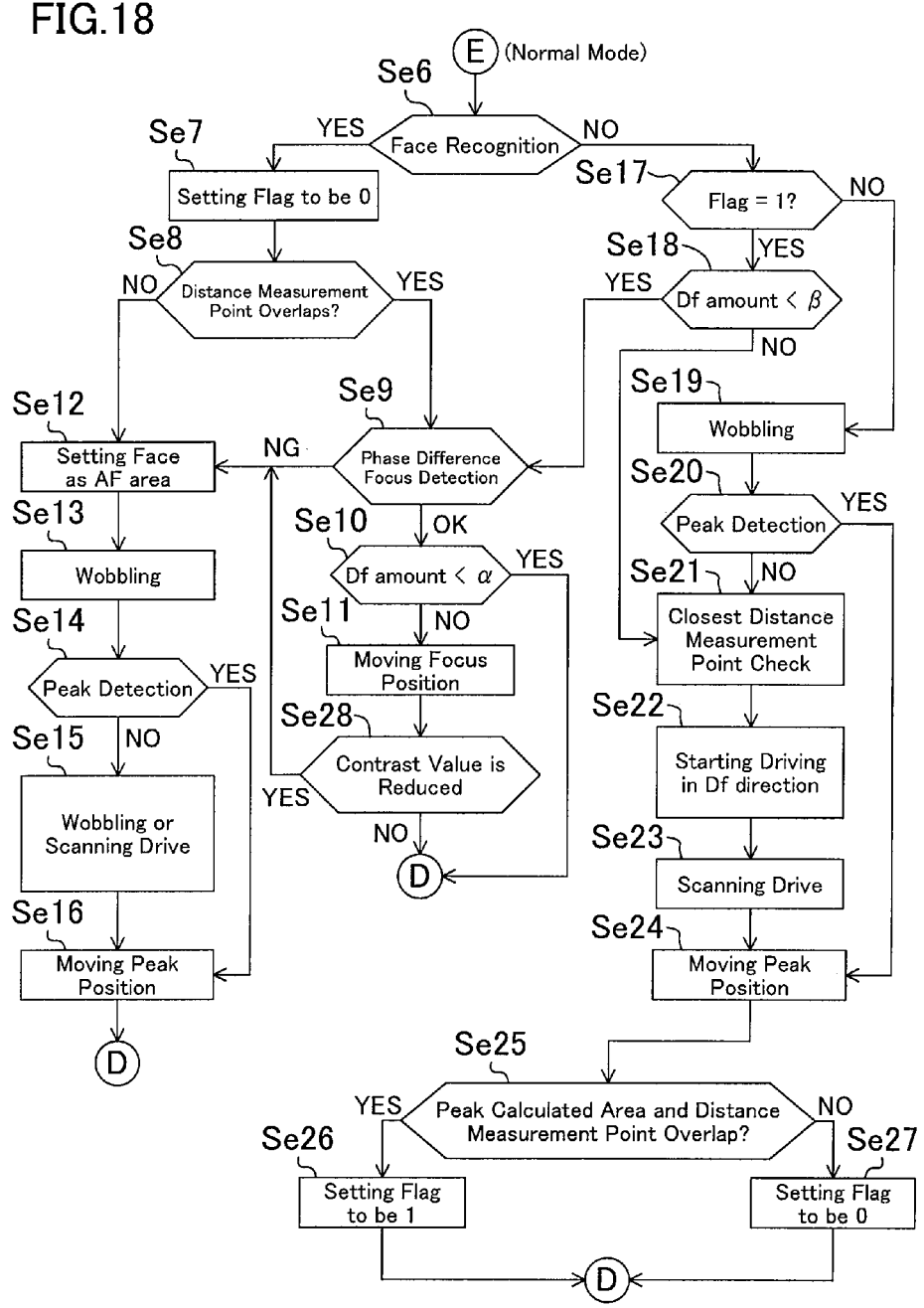
FIG. 18 is a flowchart of the steps in normal mode AF.

FIG. 18 is a flowchart of the steps in normal mode AF. First, the body microcomputer 50 extracts a position or an area of a face as a feature point of an object, based on an output from the imaging device 10 (Step Se6). In this case, when the body microcomputer 50 detects, based on an image signal, that there is a face of the object, the body microcomputer 50 sets a flag to be 0 (Step Se7) and determines whether or not there is a distance measurement point corresponding to a position overlapping an area of a recognized face (Step Se8). When there is the distance measurement point, the process proceeds to phase difference focus detection (Step Se9). Each operation in face recognition (Step Se6) and distance measurement point overlapping determination (Step Se8) is performed in the same manner as Step Sd5 and Step Sd8 in object detection AF (FIG. 15) described above.

In Step Se9, the body microcomputer 50 performs phase difference focus detection (Step Se9). Specifically, the body microcomputer 50 performs phase difference focus detection using a distance measurement point located at a position corresponding to a detected face. In phase difference focus detection (Step Sa6 and Step Sc6) in still picture shooting mode, in order to perform focus detection as fast as possible, the body microcomputer 50 adjusts, based on photometric information, photographic sensitivity and an electrical charge storage time to be optimal within a range where the SN ratio of the phase difference detection unit 20 can be maintained. Specifically, the body microcomputer 50 sets the electrical charge storage time to be shorter than the electrical charge storage time in phase difference focus detection (Step Se9) in moving picture shooting mode, which will be described later. Meantime, in phase difference focus detection (Step Se9) in the moving picture shooting mode, the body microcomputer 50 adjusts, based on the photometric information, photographic sensitivity and the electrical charge storage time to be optimal within a range where the S/N ratio of the phase difference detection unit 20 can be maintained, as in distance measurement which is performed over a relatively long time in order to perform optimal focus detection in moving picture shooting. Specifically, the body microcomputer 50 sets the electrical charge storage time to be longer than the electrical charge storage time in phase difference focus detection (Step Sa6 and Step Sc6) in still picture shooting mode which have been described above. The photographic sensitivity is controlled to be optimal according to the electrical charge storage time. Moreover, detection frequency is reduced by increasing the electrical charge storage time, thereby preventing the position of the focus lens group 72 from being changed little by little due to small movements of an object.

When phase difference focus detection is possible, the body microcomputer 50 determines whether or not the Df amount obtained in Step Se9 is smaller than a predetermined amount a (Step Se10). When the body microcomputer 50 determines that the Df amount is smaller than the predetermined amount a, the process returns to (D) of FIG. 17 and automatic iA determination is performed (Step Se2). When the body microcomputer 50 determines that the Df amount is a first predetermined amount a or more, the focus lens group 72 is driven in the defocus direction by the obtained Df amount via the lens microcomputer 80 (Step Se11). Thereafter, the process returns to (D) of FIG. 17, and then, automatic iA determination is performed (Step Se2).

Even while the focus lens group 72 is driven to a focus position in Step Se11, the body microcomputer 50 performs contrast value calculation in parallel to obtaining defocus information. In Step Se28, when the contrast value is reduced because an object is a type of object such as, for example, a repetitive pattern and the like, which easily causes misdetection by the phase difference focus detection section, it is determined that phase difference focus detection is not appropriate to perform. More specifically, when the contrast value is changed little by little while the Df amount is smaller than the predetermined value, it is determined that phase difference focus detection is not appropriate to perform.

In Step Se9, when it is determined that phase difference focus detection is impossible or inappropriate to perform because an object image has a low contrast or a low intensity, the process proceeds to Step Se12. Specifically, when S/N of obtained data of defocus information is low, or when an output value is low, the body microcomputer 50 determines that phase difference focus detection is impossible or inappropriate to perform.

When the process returns to Step Se8 and the body microcomputer 50 determines that there is no distance measurement point corresponding to a position overlapping an area of a face recognized in Step Se6, the process proceeds also to Step Se12.

In Step Se12, the body microcomputer 50 sets an area of a detected face as an area of an object image to be used in calculation of contrast value performed in subsequent steps Step Se14 to Step Se16 (Step Se12), i.e., an AF area.

Next, the body microcomputer 50 performs contrast value calculation using a wobbling method (Step Se13). Specifically, the focus lens group is moved so that an object point distance of the focus lens group is changed to be longer or shorter from a current distance, and contrast value calculation is performed at positions having different object point distances. The body microcomputer 50 determines, based on each of the calculated contrast value and the position of the focus lens group, whether or not a peak position of the contrast value is confirmed (Step Se14). The "peak position" used herein is a position of the focus lens group 72 at which the contrast value is a local maximum value, during increase in object point distance.

If the body microcomputer 50 can confirm the peak position, the process proceeds to Step Se16, which will be described later. If the body microcomputer 50 cannot confirm the peak position, the process proceeds to Se15, and then, the body microcomputer 50 performs contrast value calculation using wobbling method in which a larger amplitude is employed, or scanning drive to detect a peak of the contrast value (Step Se15). Scanning drive is the same operation as the operation performed in Step Sb6 through Step Sb10 in contrast detection AF in still picture shooting until the process proceeds to YES in Step Sb10.

Next, the body microcomputer 50 performs control to drive the focus lens group 72 to the detected peak position (Step Se16). Thereafter, the process returns to (D) of FIG. 17, automatic iA determination is performed (Step Se2).

In the wobbling method or scanning drive, reverse drive of the focus lens group 72 is performed, and thus, the AF speed is low. Therefore, to preferentially perform phase difference detection in which the AF speed is high and the direction in which a focus lens is driven to a focus position can be simultaneously determined, the determination in Step Se8 is performed.

When the process returns to Step Se6 and the body microcomputer 50 determines that a face of an object cannot be recognized, the body microcomputer 50 confirms whether or not a flag is 1 (Step Se17). The flag indicates in Step Se25, which will be described later, whether or not there is a distance measurement point at a position of an object image of an object located closest to the user.

When the flag is 1, it indicates that it has been determined that there is a distance measurement point at a position of an object image of an object located closest to the user. The body microcomputer 50 performs phase difference focus detection at the corresponding distance measurement point to determine whether or not the Df amount is smaller than a second predetermined amount β (Step Se18). The second predetermined amount f3 is larger than the first predetermined amount a. In Step Se18, the body microcomputer 50 determines whether or not the object image is still at the distance measurement point for which the Df amount has been calculated. When the object image is still at the distance measurement point, it can be estimated that change in focus state at the overlapping distance measurement point is small in a short amount of time from a time point where the object is brought in focus in Step Se24, which will be described later, to a time point where the Step Se18 is performed again. Thus, when the body microcomputer 50 determines that change in Df amount, i.e., the Df amount is small (Df amount <β), the process proceeds to Step Se9, and phase difference focus detection is performed using the distance measurement point.

When the object is moved from the overlapping distance measurement point in a short amount of time from a time point where the object is brought in focus in Step Se24, which will be described later, to a time point where the Step Se18 is performed again, the distance measurement point should not be used. In such a case, the body microcomputer 50 determines that change in Df amount at the distance measurement point, i.e., the Df amount is large (Df amount >β), and the process proceeds to Step Se21.

In Step Se17, when the body microcomputer 50 determines that the flag is not 1, i.e., the flag is 0, contrast value calculation is performed using the wobbling method in Se19 (Step Se19). This operation is the same as the operation in Step Se13, and contrast value calculation may be performed in any manner, for example, to a center portion of an object image, a plurality of areas, an entire object image, or the like. The body microcomputer 50 determines whether or not the peak position is detected (Step Se19). When the peak position is detected, the process proceeds to Step Se24. When the peak position is not detected, the process proceeds to Step Se20.

The operation in Step Se21 and subsequent steps is an operation of bringing an object located closest to the user in focus on the assumption that a main object is located closest to the user. First, a distance measurement point at which light of an object image at a relatively smallest distance is received is selected from a plurality of distance measurement points, and defocus information is obtained from the distance measurement point (Step Se21). Then, driving of the focus lens group 72 is started in the defocus direction of the obtained defocus information (Step Se22). In this step, the direction of an object desired to be brought in focus is predicted. Thereafter, the body microcomputer 50 performs scanning drive (Step Se23). Scanning drive is the same operation as the operation performed in Step Sb6 through Step Sb10 in contrast detection AF in still picture shooting until the process proceeds to YES in Step Sb10. In Step Se23, contrast value calculation is performed to each of a plurality of areas of an object image, and a peak position in one of the areas having a peak position located closest to the user is calculated.

In Step Se24, the body microcomputer 50 performs control to drive the focus lens group 72 to the peak position (Step Se24). Thereafter, the body microcomputer 50 determines whether or not there is a distance measurement point at a position overlapping an area of an object image for which a peak position is calculated (Step Se25). If there is the corresponding distance measurement point, the body microcomputer 50 stores which distance measurement point corresponds to the overlapping position and sets the flag to be 1 (Step Se26), and the process returns to (D) of FIG. 17. If there is no corresponding distance measurement point, the body microcomputer 50 sets the flag to be 0 (Step Se26), and the process returns to (D) of FIG. 17.

(Macro Mode AF)

Figure 19:
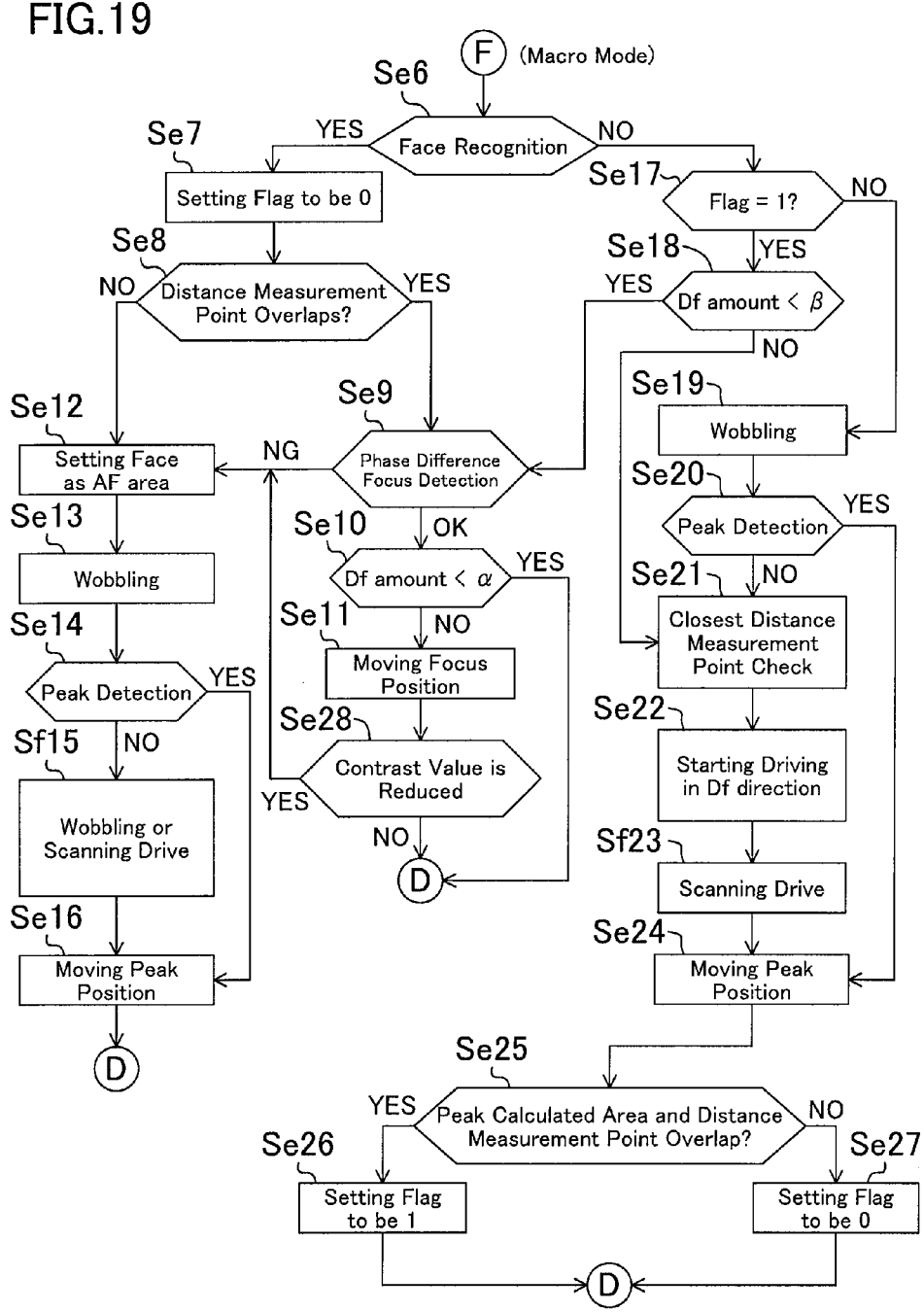
FIG. 19 is a flowchart of the steps in macro mode AF.

FIG. 19 is a flowchart of the steps in macro mode AF. Basically, the operation as the operation of AF in normal mode is performed. Therefore, regarding the operation in macro mode AF, only different points from AF in normal mode will be described. In the flowchart of AF in macro mode (FIG. 19), a step corresponding to each of the steps of AF in normal mode (FIG. 18) is identified by the same reference numeral, and therefore, the description of the step will be omitted.

In the macro mode, an object located closest to the camera 100 is brought in focus. In scanning drive of Step Sf15 and scanning drive of Step Sf23, peak detection is performed in a range in which the object point distance is smaller than that in Step Se15 or Se16 in normal mode.

Other than that, the operation in macro mode is the same as the operation of AF in normal mode. After completing AF in macro mode, the process returns to (D) of FIG. 17.

(Landscape Mode AF)

Figure 20:
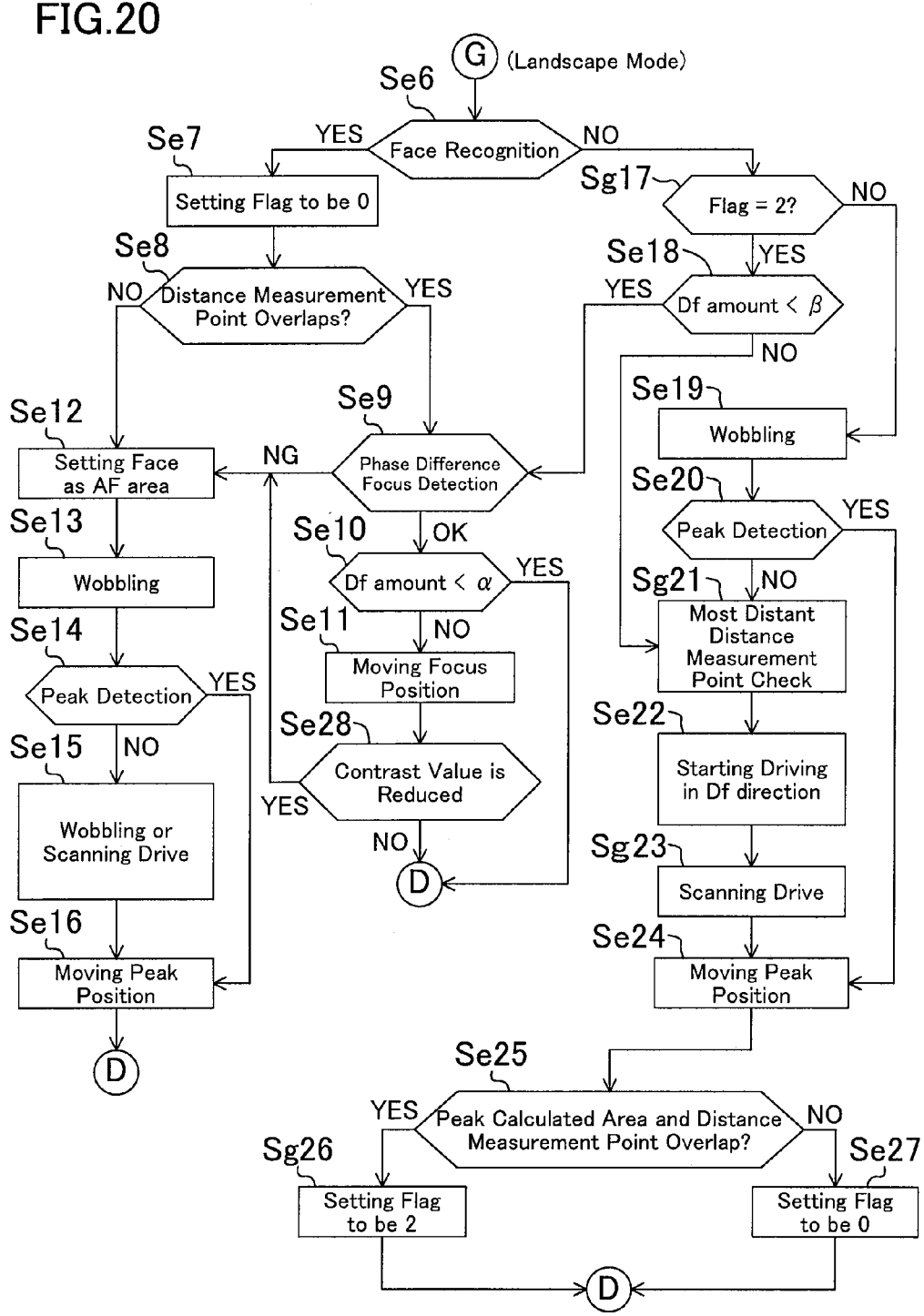
FIG. 20 is a flowchart of the steps in landscape mode AF.

FIG. 20 is a flowchart of the steps in landscape mode AF. Basically, the same operation as the operation of AF in normal mode is performed. Therefore, regarding the operation in landscape mode AF, only different points from AF in normal mode will be described. In the flowchart of AF in landscape mode (FIG. 20), a step corresponding to each of the steps of AF in normal mode (FIG. 18) is identified by the same reference numeral, and therefore, the description of the step will be omitted.

In landscape mode, an object located distant from the camera 100 is brought in focus. In Step Sg21, a distance measurement point at which light of an object image at a relatively largest distance is received is selected from a plurality of distance measurement points, and defocus information is obtained from the distance measurement point (Step Sg21). In Step Sg23, contrast value calculation is performed to each of a plurality of areas of an object image, and a peak position in an area having a peak position at a largest distance is calculated. If it is determined in Step Se25 there is a distance measurement point corresponding to a position overlapping an area for which a peak position is calculated, a flag is set to be 2 in Step Sg26. Then, in Step Sg17, it is determined, based on the determination on whether or not the flag is 2, whether or not there has been a distance measurement area corresponding to a position overlapping an object located most distant right before the step.

Other than that, the operation in landscape mode is the same as the operation of AF in normal mode. After completing AF in landscape mode, the process returns to (D) of FIG. 17.

(Spotlight Mode AF)

Figure 21:
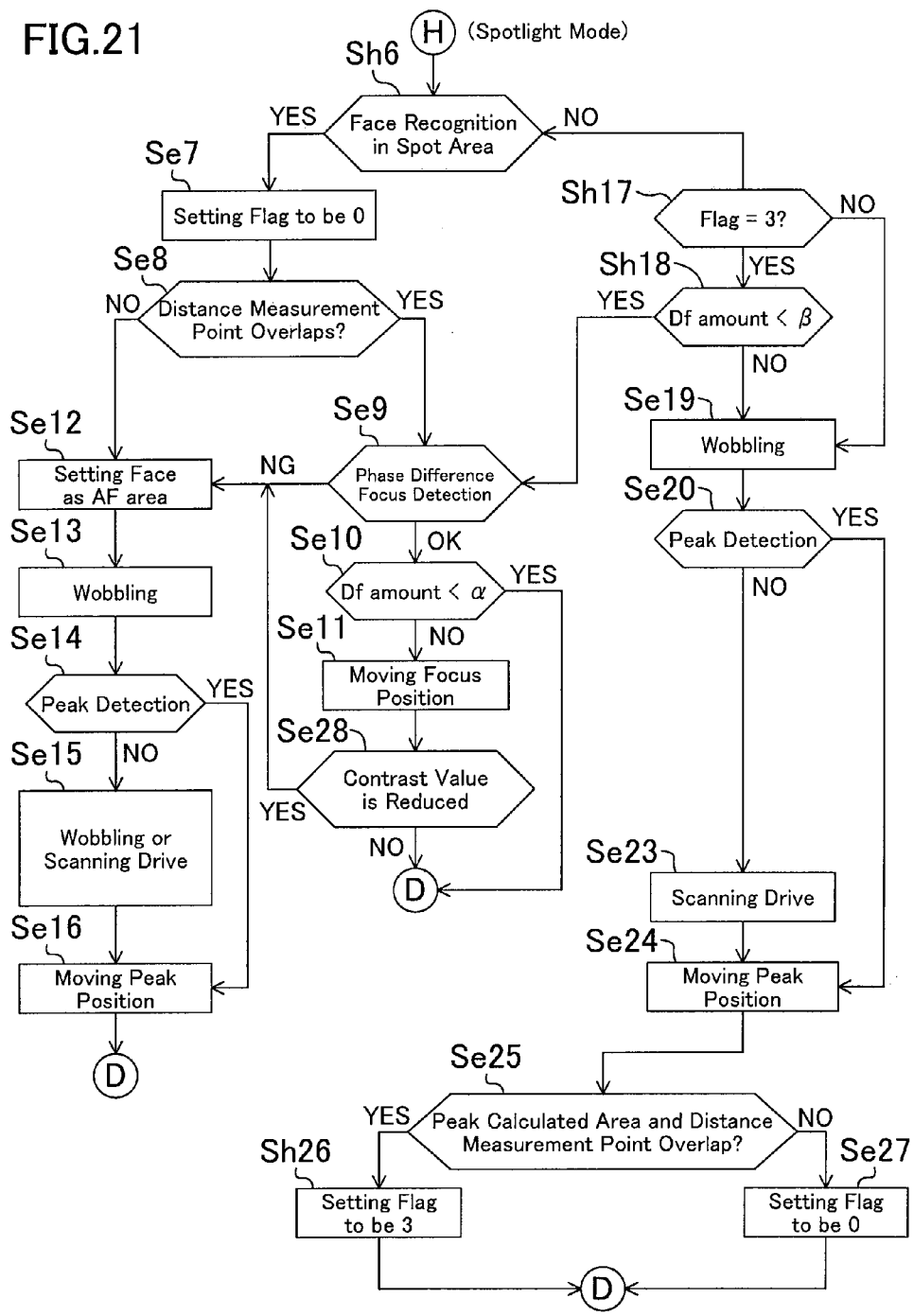
FIG. 21 is a flowchart of the steps in spotlight mode AF.

FIG. 21 is a flowchart of the steps in spotlight mode AF. Basically, the same operation as the operation of AF in normal mode is performed. Therefore, regarding the operation in spotlight mode AF, only different points from AF in normal mode will be described. In the flowchart of AF in spotlight mode (FIG. 21), a step corresponding to each of the steps of AF in normal mode (FIG. 18) is identified by the same reference numeral, and therefore, the description of the step will be omitted.

In spotlight mode, an object is irradiated with a spotlight, and thus, the exposure has to be optimized in parallel to AF operation, which will be described later. Therefore, the body microcomputer 50 performs exposure control so that the exposure is optimized in an area irradiated with a spotlight.

In Step Sh6, the body microcomputer 50 performs face recognition in an area of an object irradiated with a spotlight.

In spotlight mode, there is no step corresponding to Step Se21 and Step Se22 in normal mode. In Step Sh18, the same determination as the determination in Step Se18 is performed. However, in this case, when a result of the determination is NO, the process proceeds to Step Se19. In Step Sh20, the same determination as the determination in Step Se20 is performed. When a result of the determination is NO, the process proceeds to Step Sh23. In Step Sh23, scanning drive is performed in the same manner as in Step Se23. The body microcomputer 50 performs contrast value calculation, based on an image signal from a part of the image device 10 corresponding to an image of an object irradiated with a spotlight.

When it is determined in Step Se25 that there is a distance measurement point corresponding to a position overlapping an area for which a peak is calculated, a flag is set to be 3 in Step Sg26. Then, in Step Sh17, it is determined, based on the determination on whether or not the flag is 3, whether or not there has been a distance measurement area corresponding to a position overlapping an object irradiated with a spotlight right before the step.

Other than that, the operation in spotlight mode is the same as the operation of AF in normal mode. After completing AF in spotlight mode, the process returns to (D) of FIG. 17.

(Low Light Mode AF)

When the above-described low light state is detected, the shooting mode is changed to low light mode. For example, when a state where the object image locally includes strong light such as light incoming through a window or light of an electric lamp, for example, when shooting is performed in a room during daytime or the like is detected, the shooting mode is changed to low light mode. In such an illumination environment, when the light amount is averaged over the entire imaging plane including strong light such as light through a window or light of an electric lamp, a main object might be captured dark. To eliminate or reduce this problem, in the low light mode, the body microcomputer 50 performs control so that an area having a small intensity is captured as a bright image according to the photometry distribution.

Figure 22:
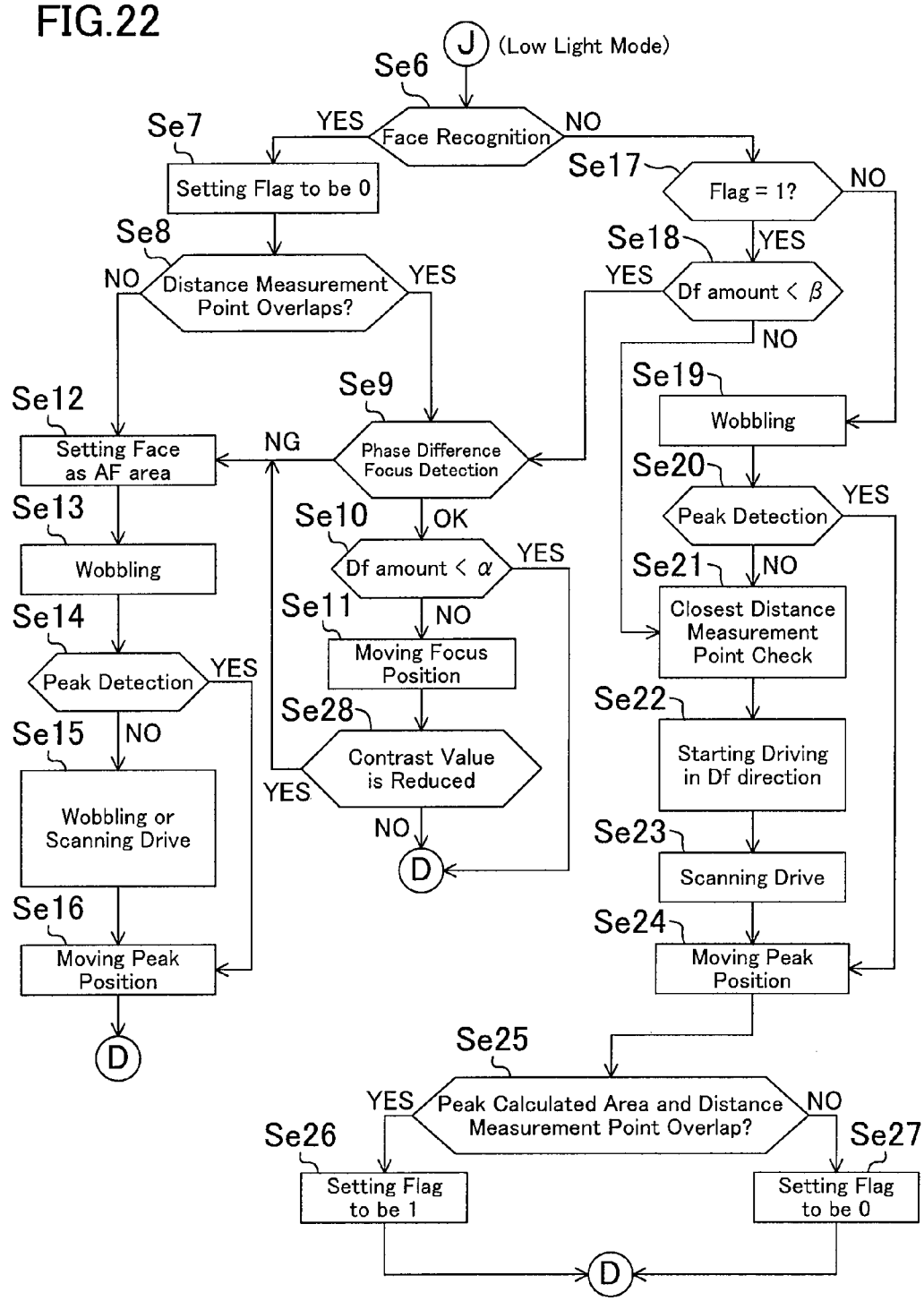
FIG. 22 is a flowchart of the steps in low light mode AF.

FIG. 22 is a flowchart of the steps in low light mode AF. In low light mode, the same operation as AF in normal mode is performed.

(Automatic Tracking AF)

Figure 23:
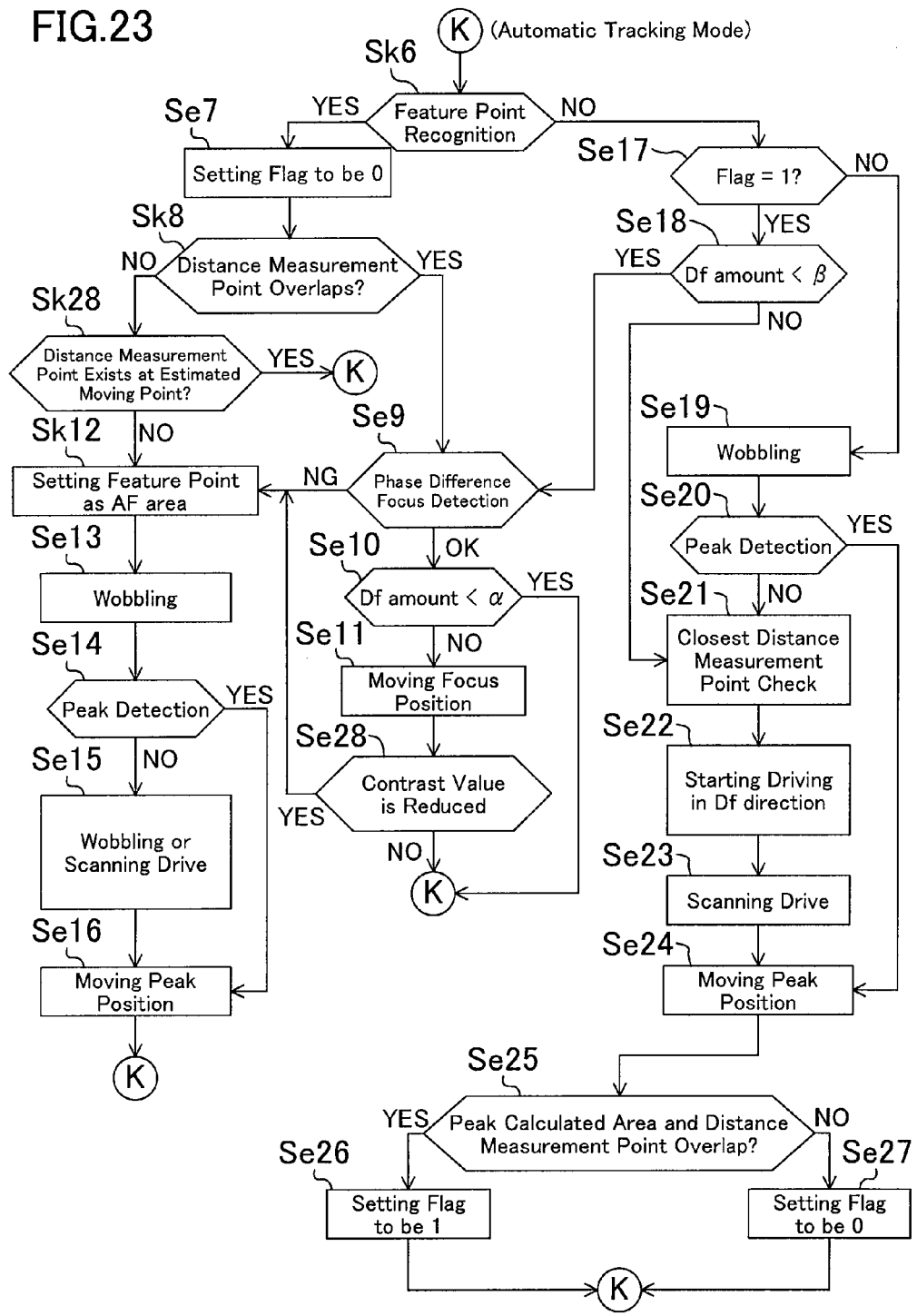
FIG. 23 is a flowchart of the steps in automatic tracking AF mode.

The camera 100 also has automatic tracking AF mode. FIG. 23 is a flowchart of the steps in automatic tracking AF mode. Basically, the same operation as the operation of AF in normal mode is performed. Therefore, regarding the operation in automatic tracking AF, only different points from AF in normal mode will be described. In the flowchart of automatic tracking AF mode (FIG. 23), a step corresponding to each of the steps of AF in normal mode (FIG. 18) is identified by the same reference numeral, and therefore, the description of the step will be omitted. Note that the above-described "command for start/stop of moving picture recording" can be accepted at any stage in automatic tracking AF mode.

The body microcomputer 50 detects a feature point of an object, based on an image signal (Step Sk6). Specifically, the body microcomputer 50 detects, based on the image signal, whether or not a feature point which has been set in advance exits in the object and, if the feature point exists in the object, detects the position and area of the feature point. For example, a feature point may be the color, shape and the like of an object. For example, as a feature point, a face of an object may be detected. For example, a general shape or color of a face may be a feature point which has been set in advance. Moreover, for example, the color, shape or the like of a part of an object selected by the user from a live view image displayed in the image display section 44 may be set as a feature point in advance. A feature point is not limited to these examples.

A feature point can be also set by the user. For example, the user can set, as a feature point (i.e., a tracking target), an object selected from a live view image displayed in the image display section 44. Specifically, for example, a screen of the image display section 44 is configured as a touch panel which allows the user to specify any area of the screen, and an object displayed in the area specified by the user can be set as a feature point. Alternatively, an object displayed in a predetermined position in the screen of the image display section 44 can be set as a feature point.

When no feature point can be recognized in Step Sk6, the operation as the operation in Step Se11 through Step Se27 of FIG. 18 is performed, and the process returns to (K) of FIG. 23 to perform feature point recognition again (Step Sk6).

When a feature point is recognized in Step Sk6, as in Step Se8 of FIG. 18, it is determined whether or not there is a distance measurement point corresponding to a position overlapping an area of the recognized feature point (Step Sk8). If there is the corresponding distance measurement point, the process proceeds to phase difference focus detection (Step Se9), the same operation as the operation in Step Se9 through Step Se11 of FIG. 18 is performed, and the process returns to (K) of FIG. 23 to perform feature point recognition again (Step Sk6).

If there is no corresponding point recognized in Step Sk8, the process proceeds to Step Sk28, movement of a feature point is detected, and then, an estimated point to which the feature point moves is calculated. Then, the body microcomputer 50 determines whether or not there is a distance measurement point corresponding to a position overlapping the estimated point (Step Sk28). Then, if there is the corresponding distance measurement point, in order to hold focus driving for a while, the focus lens group 72 is not driven, and the process returns to (K) of FIG. 23 to perform feature point recognition again (Step Sk6). Thereafter, if the feature point is located at the distance measurement point, the process proceeds to YES in Step Sk8 to perform phase difference AF. Note that detection of movement of a feature point can be performed using a known method for detecting a motion vector. It can be appropriately determined how far from a current position the "estimated point to which the feature point moves is.

In Step Sk28, if it is determined that there is no distance measurement point corresponding to the estimated point to which the feature point is to be moved, the process proceeds to Step K12, and the body microcomputer 50 sets an area of the detected feature point as an AF area, i.e., an area of an object image used in contrast value calculation performed in subsequent steps, i.e., Step Se14 through Step Se16 (Step Sk12). Thereafter, the same operation as the operation from Step Se13 through Step Se16 of FIG. 18 is performed, and the process returns to (K) of FIG. 23 to perform feature point recognition again (Step Sk6).

Other Embodiments

In connection with the above-described embodiment, the following configurations may be employed.

(1) The example in which "shooting mode automatic selection function" is applied to moving picture shooting mode has been described. However, this function may be applied to still picture shooting mode. For example, in a live view display stage before S1 is turned ON in still picture shooting mode, shooting mode selection is performed using Step Se1 through Step Se5 of FIG. 17 and, after the shooting mode is changed to corresponding shooting mode (E-J), exposure control, white balance control and the like according to the corresponding shooting mode are performed, and then, the process returns to (D) of FIG. 17 without performing focusing operation. In the live view display stage before still picture shooting is performed, there is no need to bring an object in focus, and thus, power consumption for driving the focus lens group 72 can be reduced. Moreover, even when an object is not brought in focus in the live view display stage, in Step Se3, an object distance can be measured based on the current position of the focus lens group 72 and defocus information.

(2) The configuration in which AF is started when the release button 40b is pressed halfway down by a user (i.e., S1 switch is turned ON) in still picture shooting mode has been described. However, AF may be performed before the release button 40b is pressed halfway down. Also, the configuration in which AF is terminated when it is determined that an object is in focus has been described. However, AF may be continued after focus determination, and also AF may be performed without performing focus determination. A specific example will be described hereinafter. In FIGS. 11 and 12, after the shutter unit 42 is opened in Step Sa4, phase difference focus detection of Step Sa6 and focus lens driving of Step Sa1 are performed repeatedly. In parallel to this, determination of Step Sa5, photometry of Step Sa9, image blur detection of Sa10, and determination of Step Sa11 are performed. Thus, an object can be brought in focus even before the release button 40b is pressed halfway down by the user. For example, the use of this operation with live view image display allows display of a live view image in a focus state. Moreover, if phase difference detection AF is used, live view image display and phase difference detection AF can be used together. The above-described operation may be added as "always AF mode" to the function of a camera. A configuration in which "AF continuous mode" can be turned ON/OFF may be employed.

(3) The body microcomputer 50 may perform control so that a speed at which the focus lens group 72 is driven based on defocus information in moving picture shooting mode is lower than a speed at which the focus lens group 72 is driven based on defocus information in still picture shooting mode.

(4) The body microcomputer 50 may perform control so that the speed at which the focus lens group 72 is driven based on defocus information in moving picture shooting mode is changed according to a defocus amount. For example, in Step Se11 of each of FIGS. 20 through 23, the speed at which the focus lens group 72 is driven may be controlled so that the focus lens group 72 is moved to a focus point in a predetermined time according to the defocus amount. For example, in Step Se11 of FIG. 23, when a user changes a target, a moving picture image can be captured such that a new target is brought in focus at predetermined speed, for example, at low speed. Thus, the user's convenience is improved.

(5) In Example Embodiment, the configuration in which the imaging unit 1 is mounted in a camera has been described. However, the present invention is not limited to the above-described configuration. The camera in which the imaging unit 1 is mounted is an example of cameras in which the exposure of an imaging device and phase difference detection by a phase difference detection unit can be simultaneously performed. A camera according to the present invention is not limited thereto, but may have a configuration in which object light is guided to both of an imaging device and a phase difference detection unit, for example, by an optical isolation device (for example, a prism, a semi-transparent mirror, and the like) for isolating light to the image device. Moreover, a camera in which a part of each microlens of an imaging device is used as a separator lens and separator lenses are arranged so that pupil-divided object light can be received respectively at light receiving sections may be employed.

(6) Note that the above-described embodiments are essentially preferable examples which are illustrative and do not limit the present invention, its applications and the scope of use of the invention.

Features of Embodiments

Features of the above-described embodiments will be described hereinafter. The invention described in the above-described embodiments is not limited to the following description. To achieve effects described in each of the following features, components of the above-described embodiments except the described features may be modified or removed.

[A1]

An imaging apparatus includes: an imaging device for performing photoelectric conversion to convert light from an object into an electrical signal; a phase difference detection section, having a plurality of distance measurement points, for receiving the light from the object to the imaging device while the imaging device receives the light; a feature point extraction section for extracting a position or an area of a feature point of the object, based on an output from the imaging device; and a control section for selecting at least one distance measurement point from the plurality of distance measurement points, based on the position or the area of the feature point, and controlling autofocus using a signal from the selected distance measurement point.

Thus, a preferable distance measurement point can be selected.

[A2]

In the imaging apparatus described in A1, the control section selects a distance measurement point at which light from an object corresponding to the position or the area of the feature point is received.

[A3]

In the imaging apparatus described in A1, the control section selects a distance measurement point at which light from an object located vertically below the object corresponding to the position or the area of the feature point and also located in an area overlapping the object in the horizontal direction is received.

Thus, a preferable distance measurement point can be selected.

[A4]

In the imaging apparatus described in any one of A1 through A3, the control section controls autofocus further using an output from the imaging device corresponding to the position or the area of the feature point.

Thus, AF can be performed with higher accuracy.

[A5]

In the imaging apparatus described in any one of A1 through A4, the imaging device is configured so that light passes through the imaging device, and the phase difference detection section is configured so as to receive light which has passed through the imaging device.

[B1]

An imaging apparatus includes: an imaging device for performing photoelectric conversion to convert light from an object into an electrical signal; a phase difference detection section for receiving the light from the object to the imaging device while the imaging device receives the light, and performing phase difference detection; a focus lens group for adjusting a focus position; a focus lens position detection section for detecting a position of a focus lens; and a control section for calculating an object distance based on an output of the focus lens position detection section and an output of the phase difference detection section and automatically selecting one of a plurality of shooting modes according to the calculated object distance.

Thus, preferable shooting mode can be selected. Also, even when the focus lens group is not at a focus position, preferable shooting mode can be selected.

[B2]

In the imaging apparatus described in B1, the control section selects a first shooting mode when the calculated object distance is smaller than a predetermined first distance.

[B3]

In the imaging apparatus described in B2, the control section selects a second shooting mode when the calculated object distance is larger than a predetermined second distance which is larger than the first distance.

[B4]

In the imaging apparatus described in B3, the imaging device performs photometry for measuring an amount and distribution of light entering the imaging device, and the control section measures, when the calculated object distance is between the first distance and the second distance, the amount and distribution of the light entering the imaging device, based on an output from the imaging device, and selects a third shooting mode, based on the amount and distribution of the light.

[B5]

In the imaging apparatus described in any one of B1 through B4, the imaging device is configured so that light passes through the imaging device, and the phase difference detection section is configured so as to receive light which has passed through the imaging device.

[B6]

In the imaging apparatus described in any one of B1 through B5, if a contrast value based on the output from the imaging device is reduced when the focus lens group is driven in a defocus direction, based on a detection result of the phase difference detection section, the control section stops focus driving according to phase difference detection.

[B7]

An imaging apparatus includes: an imaging device for performing photoelectric conversion to convert light from an object into an electrical signal; a phase difference detection section for receiving the light from the object to perform phase difference detection; and a control section for controlling an electrical charge storage time of the phase difference detection section, and the control section performs control so that the electrical charge storage time in still picture shooting and the electrical charge storage time in moving picture shooting and recording are different from each other.

[B8]

In the imaging apparatus described in B7, the control section sets the electrical charge storage time in still picture shooting to be longer than the electrical charge storage time in moving picture shooting and recording.

As has been described, the present invention is useful particularly for an imaging apparatus which can simultaneously perform the exposure of an imaging device and phase difference detection by a phase difference detection unit.

The present invention is not limited to the above-described embodiments and can be implemented in various forms without departing from the spirit or features of the present invention. The above-described embodiments are only for illustrative purposes in any way and should not be interpreted as limiting the scope of the invention. The scope of the present invention is defined only by the appended claims and is not limited to the specification. Furthermore, all equivalent modifications and variations equivalent to the scope of the appended claims fall within the scope of the invention.

What is claimed is:

1. An imaging apparatus, comprising:
an imaging device for performing photoelectric conversion to convert light from an object into an electrical signal;
a phase difference detection section for receiving the light from the object to the imaging device while the imaging device receives the light, and performing phase difference detection;
a focus lens group for adjusting a focus position;
a focus lens position detection section for detecting a position of a focus lens; and
a control section for calculating an object distance based on an output of the focus lens position detection section and an output of the phase difference detection section before focusing on the object and automatically selecting one of a plurality of shooting modes according to the calculated object distance, wherein:
the imaging device performs photometry for measuring an amount and distribution of light entering the imaging device,
the control section selects a first shooting mode when the calculated object distance is smaller than a predetermined first distance, and a second shooting mode when the calculated object distance is larger than a predetermined second distance which is larger than the first distance, and
the control section measures, when the calculated object distance is between the first distance and the second distance, the amount and distribution of the light entering the imaging device, based on an output from the imaging device, and selects a third shooting mode, based on the amount and distribution of the light.

2. The imaging apparatus of claim 1, wherein
if a contrast value based on the output from the imaging device is reduced when the focus lens group is driven in a defocus direction, based on a detection result of the phase difference detection section, the control section stops focus driving according to phase difference detection.

3. The imaging apparatus of claim 1, wherein in the plurality of shooting modes a focusing operation is performed.

4. An imaging apparatus, comprising:
- an imaging device for performing photoelectric conversion to convert light from an object into an electrical signal;
- a phase difference detection section for receiving the light from the object to the imaging device while the imaging device receives the light, and performing phase difference detection;
- a focus lens group for adjusting a focus position;
- a focus lens position detection section for detecting a position of a focus lens; and
- a control section for calculating an object distance based on an output of the focus lens position detection section and an output of the phase difference detection section before focusing on the object and automatically selecting one of a plurality of shooting modes according to the calculated object distance, wherein:
- the imaging device is configured so that light passes through the imaging device, and
- the phase difference detection section is configured so as to receive light which has passed through the imaging device.

* * * * *